(12) United States Patent
Johnson et al.

(10) Patent No.: US 11,687,850 B2
(45) Date of Patent: Jun. 27, 2023

(54) SYSTEM AND METHOD FOR PROCESSING A TASK REQUEST TO BE EXECUTED AND FULFILLED

(71) Applicant: Honda Motor Co., Ltd., Tokyo (JP)

(72) Inventors: Brian W. Johnson, San Francisco, CA (US); Masaki Nara, Utsunomiya (JP); Toshiaki Takano, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 202 days.

(21) Appl. No.: 16/197,904

(22) Filed: Nov. 21, 2018

(65) Prior Publication Data

US 2020/0160253 A1 May 21, 2020

(51) Int. Cl.
*G06Q 10/0631* (2023.01)

(52) U.S. Cl.
CPC ........ *G06Q 10/063114* (2013.01); *G06Q 10/06311* (2013.01); *G06Q 10/06316* (2013.01)

(58) Field of Classification Search
CPC ..... G06Q 10/063114; G06Q 10/06316; G06Q 10/06311
USPC .............................................. 705/7.14, 7.15
See application file for complete search history.

(56) References Cited

U.S. PATENT DOCUMENTS

| | | | |
|---|---|---|---|
| 7,251,621 B1 | 7/2007 | Weng | |
| 7,818,317 B1 | 10/2010 | Emigh et al. | |
| 7,889,101 B2 | 2/2011 | Yokota | |
| 7,974,873 B2 | 7/2011 | Simmons et al. | |
| 8,768,763 B2 | 7/2014 | Horvitz et al. | |
| 8,806,613 B2 | 8/2014 | Zafiroglu et al. | |
| 9,356,790 B2 | 5/2016 | Zambetti et al. | |
| 9,390,435 B2 | 7/2016 | Mamdani et al. | |
| 9,412,086 B2 | 8/2016 | Morse et al. | |
| 9,557,185 B2 | 1/2017 | Kimes | |
| 9,618,346 B2 | 4/2017 | Wenneman et al. | |
| 9,652,749 B2 | 5/2017 | Jayanthi et al. | |
| 9,754,492 B2 | 9/2017 | Del Vecchio et al. | |
| 9,830,638 B2 | 11/2017 | Ruckart et al. | |
| 10,043,148 B1 | 8/2018 | Chowdhary | |
| 10,192,553 B1* | 1/2019 | Chenier | H04L 65/80 |
| 11,176,940 B1* | 11/2021 | Zhong | G06F 3/167 |
| 2004/0093274 A1 | 5/2004 | Vanska et al. | |
| 2005/0108091 A1 | 5/2005 | Sotak et al. | |
| 2005/0182773 A1* | 8/2005 | Feinsmith | G06Q 30/02 |
| 2006/0265294 A1 | 11/2006 | de Sylva | |

(Continued)

OTHER PUBLICATIONS

Office Action of U.S. Appl. No. 16/197,974 dated Aug. 7, 2020, 26 pages.

(Continued)

*Primary Examiner* — Renae Feacher
(74) *Attorney, Agent, or Firm* — Rankin, Hill & Clark LLP

(57) ABSTRACT

A system and method for processing a task request to be executed and fulfilled that include receiving at least one data input. The system and method additionally include determining the task request based on the at least one data input and determining at least one request attribute associated with the task request. The system and method also include assigning an agent to execute and fulfill the task request based on the at least one request attribute. The system and method further include creating the task to execute and fulfill the task request.

20 Claims, 13 Drawing Sheets

(56) References Cited

U.S. PATENT DOCUMENTS

| | | |
|---|---|---|
| 2007/0067199 A1 | 3/2007 | Shine et al. |
| 2007/0150375 A1 | 6/2007 | Yang |
| 2007/0168215 A1* | 7/2007 | Tang .................. G06Q 10/109 |
| | | 379/88.04 |
| 2007/0255611 A1 | 11/2007 | Mezo et al. |
| 2008/0005168 A1 | 1/2008 | Huff et al. |
| 2008/0140597 A1 | 6/2008 | Satir et al. |
| 2009/0239552 A1 | 9/2009 | Churchill et al. |
| 2010/0114944 A1* | 5/2010 | Adler .................. G10L 13/027 |
| | | 707/E17.062 |
| 2010/0211428 A1 | 8/2010 | Duffy et al. |
| 2011/0055046 A1 | 3/2011 | Bowen et al. |
| 2011/0137700 A1* | 6/2011 | Hamalainen ....... G06Q 10/1093 |
| | | 705/7.18 |
| 2011/0145822 A1 | 6/2011 | Rowe et al. |
| 2012/0035952 A1* | 2/2012 | Coyne .................. G06Q 40/08 |
| | | 705/2 |
| 2012/0123674 A1 | 5/2012 | Perks et al. |
| 2013/0124362 A1 | 5/2013 | Katcher |
| 2014/0095167 A1* | 4/2014 | Lynch ................. G10L 21/10 |
| | | 704/270.1 |
| 2014/0156327 A1 | 6/2014 | Cai |
| 2014/0180865 A1 | 6/2014 | Argue et al. |
| 2014/0256361 A1* | 9/2014 | Gailey ............... G06Q 30/0267 |
| | | 455/456.3 |
| 2014/0258193 A1 | 9/2014 | Christophel et al. |
| 2014/0278642 A1 | 9/2014 | Robinson et al. |
| 2014/0297743 A1 | 10/2014 | Zyto et al. |
| 2014/0314225 A1 | 10/2014 | Riahi et al. |
| 2015/0006222 A1 | 1/2015 | Isherwood et al. |
| 2015/0142594 A1 | 5/2015 | Lutnick et al. |
| 2015/0161563 A1 | 6/2015 | Mehrabi |
| 2015/0221015 A1 | 8/2015 | Laha |
| 2015/0356501 A1 | 12/2015 | Gorjestani et al. |
| 2015/0356519 A1 | 12/2015 | Wansley et al. |
| 2016/0042735 A1* | 2/2016 | Vibbert ............... G10L 15/1822 |
| | | 704/257 |
| 2016/0048905 A1 | 2/2016 | Yuan |
| 2016/0078773 A1* | 3/2016 | Carter .................. G09B 7/02 |
| | | 434/353 |
| 2016/0104113 A1 | 4/2016 | Gorlin |
| 2016/0155072 A1 | 6/2016 | Prodromidis et al. |
| 2016/0247109 A1 | 8/2016 | Scicluna et al. |
| 2016/0283480 A1 | 9/2016 | Zhuang et al. |
| 2016/0300178 A1 | 10/2016 | Perry et al. |
| 2016/0314452 A1 | 10/2016 | Pochic et al. |
| 2016/0336024 A1* | 11/2016 | Choi .................. G10L 15/22 |
| 2017/0039505 A1 | 2/2017 | Prabhakara et al. |
| 2017/0069013 A1 | 3/2017 | Castillo |
| 2017/0345115 A1 | 11/2017 | Haparnas et al. |
| 2017/0372403 A1 | 12/2017 | Jouhikainen et al. |
| 2018/0096684 A1* | 4/2018 | Goote .................. B60R 16/023 |
| 2018/0122378 A1* | 5/2018 | Mixter ................. G10L 15/22 |
| 2018/0314891 A1* | 11/2018 | Ota ..................... G01R 33/543 |
| 2019/0050880 A1* | 2/2019 | Paul ................... G06Q 30/0207 |
| 2019/0066677 A1* | 2/2019 | Jaygarl ................ G06F 40/30 |
| 2019/0081810 A1* | 3/2019 | Jung ................... G10L 15/30 |
| 2019/0213528 A1* | 7/2019 | Gupta ................. G06Q 10/10 |
| 2019/0317526 A1* | 10/2019 | Goldman ............. G06Q 10/02 |
| 2019/0394289 A1* | 12/2019 | Lehrian ............... H04L 67/306 |
| 2020/0026534 A1* | 1/2020 | Engelhardt ........... G06F 3/0482 |
| 2020/0034757 A1 | 1/2020 | Gupta et al. |
| 2020/0228445 A1* | 7/2020 | Nishikawa ........... G06F 3/167 |
| 2020/0265375 A1 | 8/2020 | Azad |

OTHER PUBLICATIONS

Office Action of U.S. Appl. No. 16/197,974 dated Feb. 12, 2021, 31 pages.
Office Action of U.S. Appl. No. 16/197,974 dated Nov. 23, 2021, 29 pages.
Office Action of U.S. Appl. No. 16/197,974 dated May 24, 2022, 20 pages.
Office Action of U.S. Appl. No. 16/197,974 dated Sep. 1, 2022, 18 pages.
Notice of Allowance of U.S. Appl. No. 16/197,974 dated Feb. 24, 2023, 17 pages.

* cited by examiner

| TASKS | STATUS | ASSIGNED AGENT | DATE STAMP | EXECUTION TIME STAMP | FULFILLMENT TIME STAMP |
|---|---|---|---|---|---|
| GROCERY PICKUP: GROCERY LIST ATTACHED TO TASK | ACTIVE | BOB SMITH | (TODAY) 7/7/2018 | 4:00PM EDT | |
| AIRPORT DROPOFF: ITINERARY ATTACHED TO TASK | ACTIVE | JANE SMITH | 7/11/2018 | | |
| AIRPORT PICKUP: ITINERARY ATTACHED TO TASK | ACTIVE | ABC CAR SERVICE | 7/18/2018 | | |
| SCHOOL PICKUP: MIKE SMITH: POI: MIKE'S SCHOOL | FULFILLED | BOB SMITH | 6/30/2018 | 3:00PM EDT | 3:10PM EDT |
| DRYCLEANING PICKUP: POI: DRYCLEANER | FULFILLED | JANE SMITH | 6/28/2018 | 10:00AM EDT | 10:30AM EDT |

FIG. 2

| PREFERRED AGENT | AGENT ADDRESS | AGENT TYPE | AGENT PRIORITY | TASK CATEGORY | TASK TIMEFRAME |
|---|---|---|---|---|---|
| BOB SMITH | 123 LAKE ROAD.. | FAMILY – SON | 1 | ANY | 11:00AM – 9:00PM |
| JANE SMITH | 123 SEA LINK DR.. | FAMILY – DAUGHTER | 1 | SCHOOL PICKUP / DROPOFF | ANY |
| SAM SMITH | 345 LAKE SHORE R.. | FRIEND | 2 | ANY | 8:00AM – 8:00PM |
| ABC CAR SERVICE | 23 MAIN STREET.. | THIRD – PARTY | 1 | AIRPORT PICKUP / DROPOFF | ANY |
| XYZ FOOD DELIVERY | 44 STATE STREET.. | THIRD – PARTY | 1 | RESTAURANT FOOD DELIVERY | ANY |
| YYZ FOOD DELIVERY | 66 ACOSTA STREET.. | THIRD – PARTY | 2 | RESTAURANT FOOD DELIVERY | ANY |

FIG. 3

| POI | POI ADDRESS | CATEGORY | HOURS OF OPERATION | CATEGORY PRIORITY |
|---|---|---|---|---|
| HOME | 123 LAKE ROAD.. | HOME | N/A | |
| JANE SMITH HOME | 123 SEA LINK DR.. | HOME – DAUGHTER | | |
| HANK'S GROCERY | 34 SOUTH APPLE RO.. | GROCERY STORE | 9:00AM EDT – 9:00AM EDT | 1 |
| AL'S PIZZA | 21 SAN JOSE ROAD.. | PIZZA RESTAURANT | 11:00AM EDT – 10:00PM EDT | 1 |
| DAY DRYCLEANER | 44 MAIN STREET.. | DRY CLEANING SERVICE | 9:00AM EDT – 9:00AM EDT | 1 |
| MARIO'S PIZZA | 40 MAIN STREET.. | PIZZA RESTAURANT | 11:00AM EDT – 10:00PM EDT | 2 |

FIG. 4

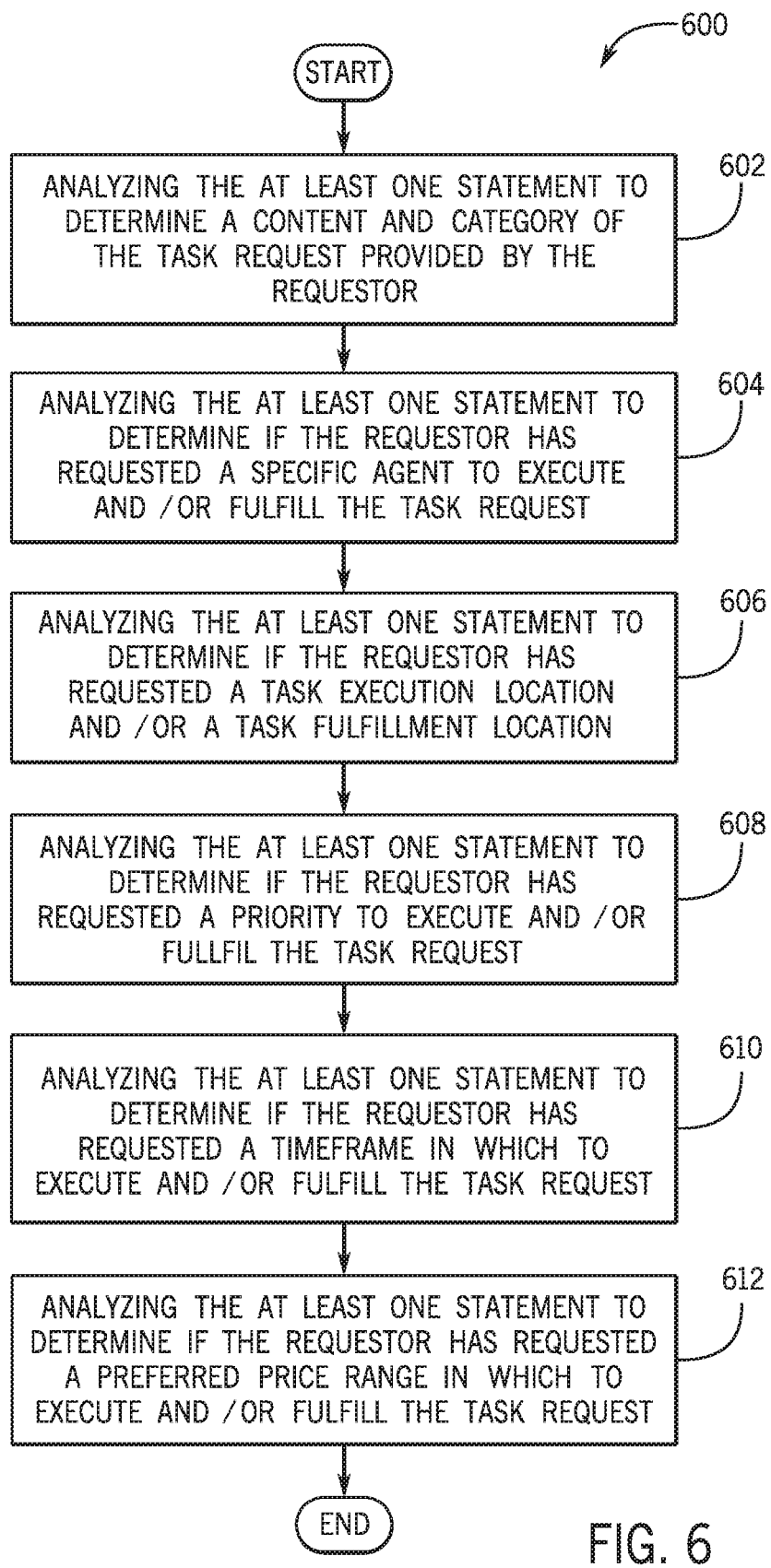

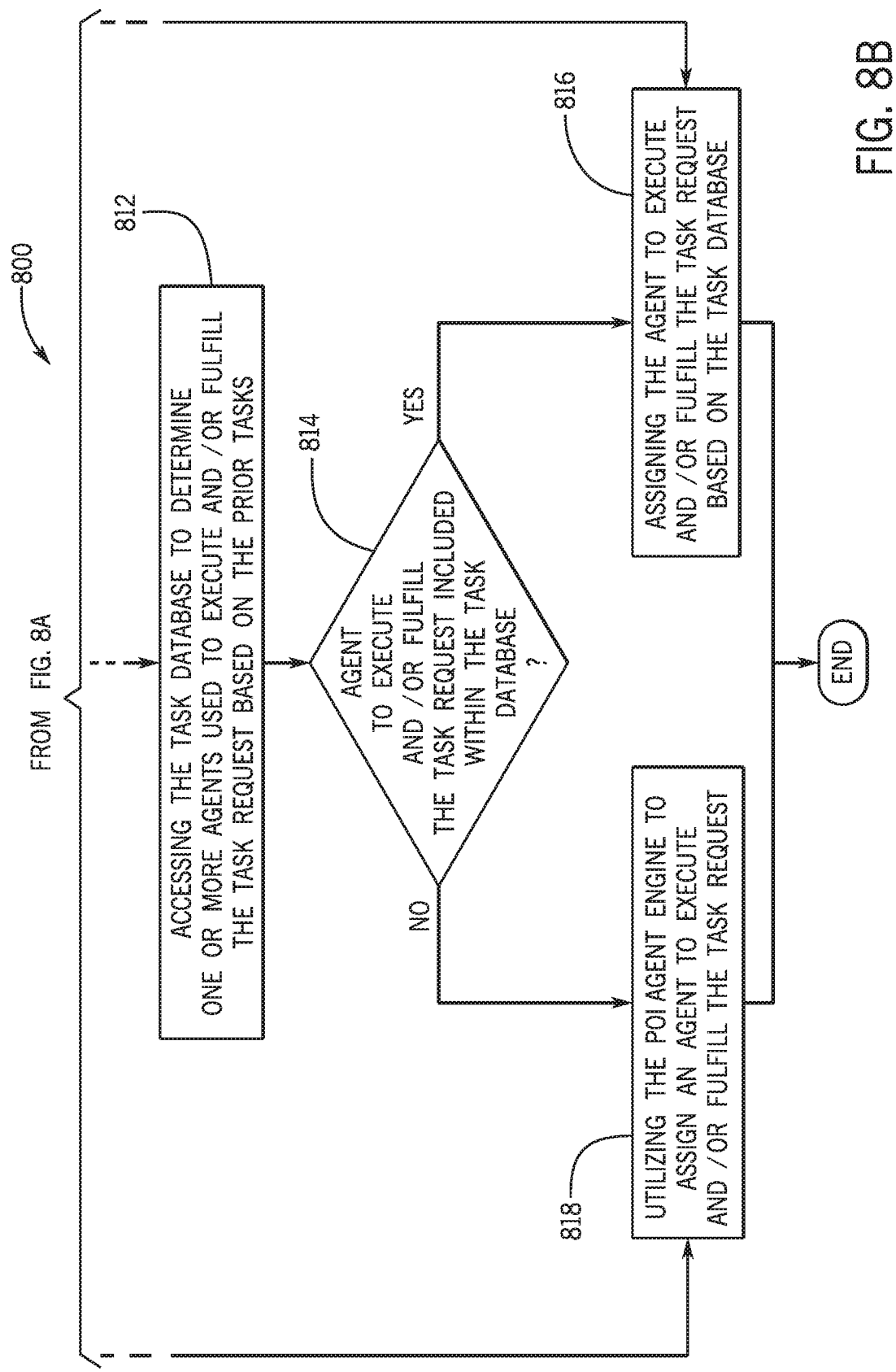

SYSTEM AND METHOD FOR PROCESSING A TASK REQUEST TO BE EXECUTED AND FULFILLED

BACKGROUND

In many instances, an individual may wish to request a task such as a service or a retrieval of a specific good. Currently, if the individual wishes to have an agent (e.g., a third-party) facilitate the request, the individual must find a particular agent to do so. Therefore, the individual may have to search through various channels to find a particular agent that may facilitate the request in a manner that is suitable to the individual. This exercise may require the individual to spend a large amount of time contacting various vendors and/or service providers to facilitate the request to ensure that an agent may be found that fulfills the request in a manner that is suitable to the individual. Additionally, the individual may need to utilize various internet websites, applications, and/or travel to various locations in order for the request to be properly fulfilled.

BRIEF DESCRIPTION

According to one aspect, a computer-implemented method for processing a task request to be executed and fulfilled that includes receiving a voice input that includes at least one data input. The data input includes at least one of: at least one voice input and at least one sensor input. The computer-implemented method also includes determining the task request based on the at least one data input and determining at least one request attribute associated with the task request. The at least one request attribute is determined based on analyzing the at least one data input. The computer-implemented method additionally includes assigning an agent to execute and fulfill the task request based on the at least one request attribute. The computer-implemented method further includes creating a task to execute and fulfill the task request. The task is sent to the agent to execute and fulfill the task request.

According to another aspect, a system for processing a task request to be executed and fulfilled that includes a memory storing instructions when executed by a processor cause the processor to receive a voice input that includes at least one data input. The data input includes at least one of: at least one voice input and at least one sensor input. The instructions also cause the processor to determine the task request based on the at least one data input and determine at least one request attribute associated with the task request. The at least one request attribute is determined based on analyzing the at least one data input. The instructions additionally cause the processor to assign an agent to execute and fulfill the task request based on the at least one request attribute. The instructions further cause the processor to create a task to execute and fulfill the task request. The task is sent to the agent to execute and fulfill the task request.

According to still another aspect, a computer readable storage medium storing instructions that when executed by a computer, which includes at least a processor, causes the computer to perform a method that includes receiving at least one data input. The data input includes at least one of: at least one voice input and at least one sensor input. The instructions also include determining a task request based on the at least one data input and determining at least one request attribute associated with the task request. The at least one request attribute is determined based on analyzing the at least one data input. The instructions additionally include assigning an agent to execute and fulfill the task request based on the at least one request attribute. The instructions further include creating a task to execute and fulfill the task request. The task is sent to the agent to execute and fulfill the task request.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 2 is an illustrative example of a subset of fields of a task database according to an exemplary embodiment;

FIG. 3 is an illustrative example of a preferred agent database according to an exemplary embodiment;

FIG. 4 is an illustrative example of a point of interest database according to an exemplary embodiment;

FIG. 6 is a process flow diagram of a method for determining one or more request attributes associated with the task request by a request determinant module of the task request application according to an exemplary embodiment;

FIG. 8B is a second process flow diagram of the method for assigning the agent to execute and/or fulfill the task request by the agent assignment module of the task request application according to an exemplary embodiment;

DETAILED DESCRIPTION

Figure 1A:
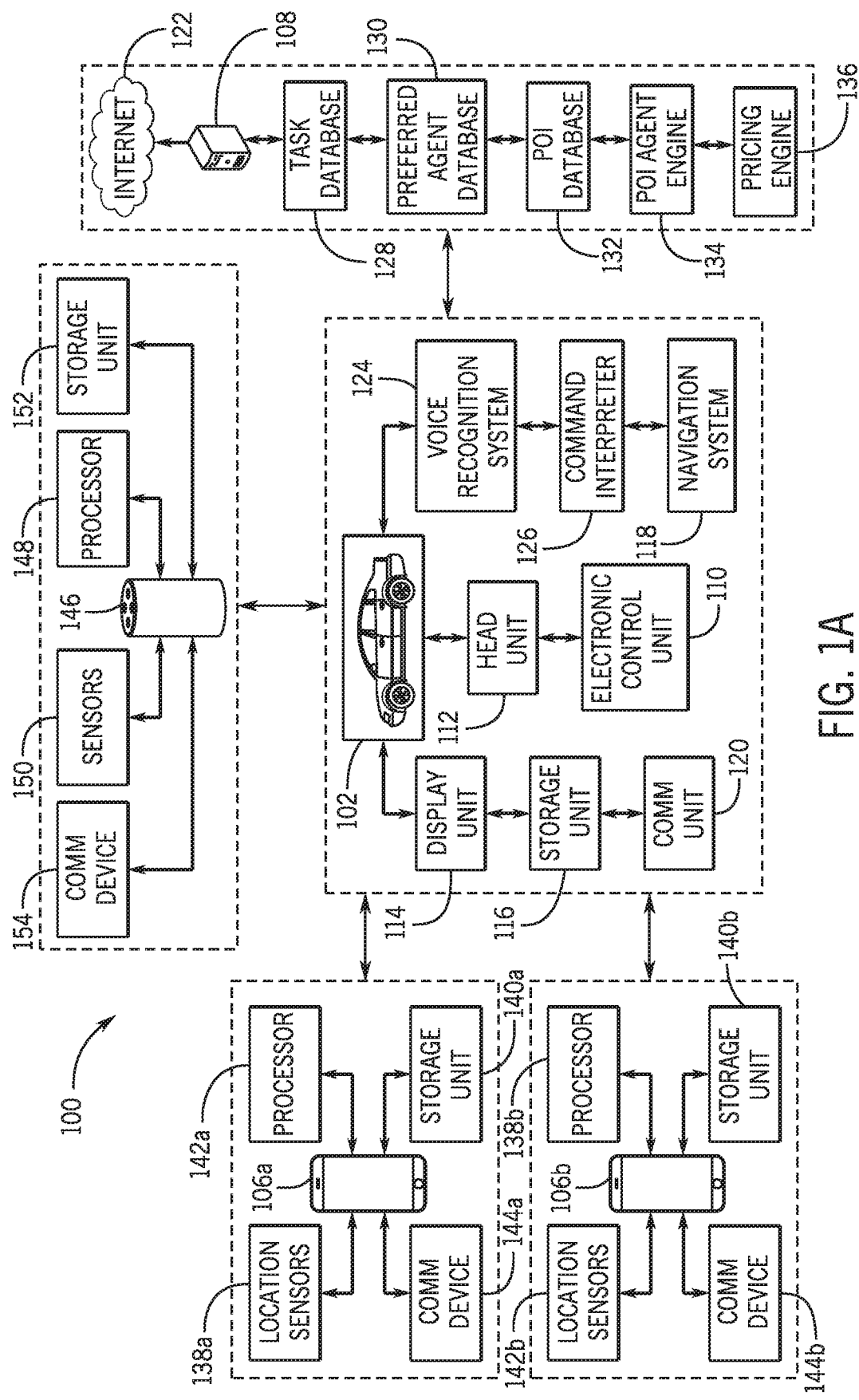
FIG. 1A is a schematic view of an exemplary operating environment of a request processing system according to an exemplary embodiment of the present disclosure.

The following includes definitions of selected terms employed herein. The definitions include various examples and/or forms of components that fall within the scope of a term and that can be used for implementation. The examples are not intended to be limiting.

A "processor," as used herein, processes signals and performs general computing and arithmetic functions. Signals processed by the processor can include digital signals, data signals, computer instructions, processor instructions, messages, a bit, a bit stream, or other computing that can be received, transmitted and/or detected.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting the same, FIG. 1A is a schematic view of an exemplary operating environment of a request fulfillment system 100 according to an exemplary embodiment of the present disclosure. The components of the request fulfillment system 100, as well as the components of other systems, hardware architectures and software architectures discussed herein, may be combined, omitted or organized into different architecture for various embodiments. However, the exemplary embodiments discussed herein focus on the system 100 as illustrated in FIG. 1A, with corresponding system components, and related methods. As shown in the illustrated embodiment of FIG. 1A, the system 100 may include a vehicle 102 that contains one or more occupants. In some configurations the one or more occupants may include one or more users of a task request processing application 104 (task request application) (shown in FIG. 1B) that are located within the vehicle 102. In some cases, the user(s) may be located outside of the vehicle 102 (e.g., at a residence, workplace, walking outside, etc.). As discussed in more detail below, the task request application 104 may be executed by one or more components of the vehicle 102, a respective portable device 106a being used by the user(s), a respective portable device 106b being used by one or more agents (not shown) (e.g., designated family members, friends, commercial service providers), one or more connected device(s) 146 utilized by the user(s) and/or an externally hosted server infrastructure (external server) 108.

In an exemplary embodiment, the task request application 104 may be executed to receive one or more data inputs that may be analyzed to determine a task request. In particular, the one or more data inputs may include one or more voice inputs that may be provided within the vehicle 102 (as the user(s) is an occupant of the vehicle 102) or may be provided through the portable device 106a used by the user(s) based on one or more statements that are communicated by the user(s). The one or more data inputs may also include one or more sensor inputs that may be provided by the one or more connected devices 146. The one or more connected devices 146 may include, but may not be limited to a personal electronic assistant, a smart appliance such as a smart refrigerator, and/or one or more smart objects such as a smart wallet. In some configurations, the one or more sensor inputs may be provided based on a determination by the connected device(s) 146 that a requirement is to be fulfilled. For example, the one or more sensor inputs may be provided based on sensing that that an air filter needs to be replaced that may be utilized by a smart HVAC unit.

The task request application 104 may be configured to determine one or more instructions based on analysis of the voice input(s) and/or the sensor input(s) and may thereby designate one of the one or more users as a requestor (not shown) who is providing a task request or who is utilizing the connected device(s) 146 (e.g., pre-programmed as a user of one or more connected devices 146) to be processed by the application 104 to be executed and/or fulfilled. As discussed in more detail below, the task request application 104 may analyze the one or more data inputs to determine one or more request attributes associated with the task request provided by the designated requestor. The task request application 104 may additionally assign a particular agent (not shown) to execute and fulfill the task request based on the one or more request attributes of the task request.

Upon assigning the task request to the assigned agent, the task request application 104 may electronically create a task that is associated with the task request. As discussed in more detail below, the task may be sent to the assigned agent with one or more details that pertain to the request attributes that include the locations to execute and fulfill the task and a computed urgency associated with the task. The task request application 104 may thereby send the task to the assigned agent through the portable device 106b or a stand-alone computing device (not shown) (e.g., desktop) used by the assigned agent in order to execute and fulfill the task request in accordance with one or more statements provided by the requestor of the task request.

With continued reference to FIG. 1A, the vehicle 102 may generally include an electronic control unit (ECU) 110 that operably controls a plurality of components of the vehicle 102. In an exemplary embodiment, the ECU 110 of the vehicle 102 may include a processor (not shown), a memory (not shown), a disk (not shown), and an input/output (I/O) interface (not shown), which are each operably connected for computer communication via a bus (not shown). The I/O interface provides software and hardware to facilitate data input and output between the components of the ECU 110 and other components, networks, and data sources, of the system 100. In one embodiment, the ECU 110 may execute one or more operating systems, applications, and/or interfaces that are associated with the vehicle 102.

In one or more configurations, the ECU 110 may be in communication with a head unit 112. The head unit 112 may include internal processing memory, an interface circuit, and bus lines (components of the head unit not shown) for transferring data, sending commands, and communicating with the components of the vehicle 102. In one or more embodiments, the ECU 110 and/or the head unit 112 may execute one or more operating systems, applications, and/or interfaces that are associated to the vehicle 102 through a display unit 114 of the head unit 112. In particular, the display unit 114 may be disposed within a center stack area (not shown) of the vehicle 102 and may be utilized to display one or more application human machine interfaces (application HMI) to provide the user(s) with various types of information and/or to receive one or more inputs from the user(s). The display unit 114 may be capable of receiving inputs from the user(s) directly or through an associated keyboard/touchpad (not shown) In one embodiment, the application HMIs may pertain to one or more application interfaces, including one or more user interfaces associated with the task request application 104. As discussed below, the one or more user interfaces associated with the task request application 104 may be presented through the display unit 114, the respective portable device 106a used by the user(s), and/or the respective portable device 106b used by the agent(s).

In an exemplary embodiment, the vehicle 102 may additionally include a storage unit 116. The storage unit 116 may store one or more operating systems, applications, associated operating system data, application data, vehicle system and subsystem user interface data, and the like that are executed by the ECU 110, the head unit 112, and one or more applications executed by the ECU 110 and/or the head unit 112 including the task request application 104. In one embodiment, the task request application 104 may store application data on the storage unit 116. The application data may be retrieved by the application 104 when interpreting the task request in the form of one or more voice inputs received from the user(s) designated as the requestor, evaluating one or more sensor inputs received from the connected device(s) 146 and/or when determining one or more request attributes to facilitate execution and fulfillment of the task request.

In one embodiment, the ECU 110 and/or the head unit 112 may be operably connected to a navigation system 118 of the vehicle 102. The navigation system 118 may include a global positioning sensor (not shown) that is configured to determine a current geo-location (e.g., GPS, DGPS coordinates) of the vehicle 102. In one embodiment, the navigation system 118 may store and access map data (not shown) on the storage unit 116. The map data may pertain to geographical maps and satellite/aerial imagery of one or more locations at which the one or more task requests may be executed and/or fulfilled.

In some embodiments, the application 104 may communicate with the navigation system 118 to determine data associated with the current geo-location of the vehicle 102 and/or data associated with one or more locations within a predetermined distance (e.g., 35 miles) of the vehicle 102. In one configuration, the task request application 104 may communicate with the navigation system 118 to analyze the map data to determine distance data, environmental data, and point of interest data pertaining to the one or more locations at which the request task may be executed and/or fulfilled. Such data may be evaluated by the application 104 to estimate a timeframe to execute and/or fulfill the task request provided by the user(s) designated as the requestor.

In one embodiment, the ECU 110 and/or the head unit 112 may be operably connected to a communication unit 120. The communication unit 120 may be capable of providing wired or wireless computer communications utilizing various protocols to send/receive non-transitory signals internally to the plurality of components of the vehicle 102 and/or externally to external devices such as the portable device 106a used by the user(s), the portable device 106b used by the agent(s) and/or the external server 108. Generally, these protocols include a wireless system (e.g., IEEE 802.11 (Wi-Fi), IEEE 802.15.1 (Bluetooth®)), a near field communication system (NFC) (e.g., ISO 13157), a local area network (LAN), and/or a point-to-point system.

In one or more embodiments, the communication unit 120 may be configured to communicate with the respective portable device 106a used by the user(s) and/or the respective portable device 106b used by the agent(s). In some configurations, the application 104 may utilize the communication unit 120 to communicate data pertaining to the task request provided by the user(s). For example, if the user(s) provides the task request via the portable device 106a, the application 104 may utilize the communication unit 120 to communicate data pertaining to the task request from the portable device 106a to the ECU 110 and/or the head unit 112 of the vehicle 102.

In an additional embodiment, the communication unit 120 may also be configured to communicate with the portable device 106b used by an assigned agent (assigned by the application 104) to send a task associated with the task request to the assigned agent to execute and fulfill the task. In particular, upon creation of the task, the application 104 may utilize the communication unit 120 to communicate data pertaining to the created task to be presented via the portable device 106b. In some embodiments, the communication unit 120 may additionally be configured to communicate with the external server 108 to send and/or receive data through an internet cloud 122. As discussed below, the external server 108 may host a plurality of databases and engines (e.g., internet/web search engines) that may be accessed by the application 104 to process the task request.

In an exemplary embodiment, the vehicle 102 may include a voice recognition system 124 that may be implemented as a hardware device of the vehicle 102. The voice recognition system 124 may include one or more microphones (not shown) located within the vehicle 102 and hardware configured to receive voice data (e.g., sensed voices within the vehicle 102) provided by the user(s) within the vehicle 102. In some configurations, the voice recognition system 124 may communicate with an associated voice recognition system (not shown) of the respective portable device 106a used by the user(s) to receive voice data provided by the user(s) via one or more microphones (not shown) of the portable device 106a. In additional configurations, the voice recognition system 124 may communicate with an associated voice recognition system (not shown) of one or more connected devices 146 that are used by the user(s) to receive voice data provided by the user(s) via one or more microphones (not shown) of the connected device(s) 146. For purposes of simplicity, the voice recognition system 124 of the vehicle 102 will be discussed in more detail within this disclosure. However, it is to be appreciated that the disclosure with respect to the functionality of the voice recognition system 124 may also apply to the associated voice recognition system of the portable device 106a and/or the connected device(s) 146.

In one or more configurations, the voice recognition system 124 may be enabled to analyze voices in the form of voice data that is sensed by the microphone(s). The voice recognition system 124 may be configured to locate human speech patterns upon receiving an activation signal from the application 104. As discussed below, in one embodiment, the application 104 may present a task request user interface (not shown) through the display unit 114, the portable device 106a, and/or the connected device(s) 146 that may include a task request user interface icon that may be inputted by the user(s) to provide a spoken task request to the application 104. Upon receipt of the input to the task request user interface icon, the voice recognition system 124 may be enabled to analyze the voice data sensed by the microphone(s).

In an additional embodiment, the voice recognition system 124 may be configured to sense a particular trigger phrase that may be spoken by one of the one or more users within the vehicle 102, through the respective portable device 106a, and/or to one or more connected devices 146. Upon sensing the trigger phrase, the voice recognition system 124 may analyze the voice data sensed by the microphone(s). For example, the phrase "task request" may be used by the application 104 as a trigger phrase to enable the voice recognition system 124 to further analyze the voice data sensed by the microphone(s) to receive a spoken task request that is provided to the application 104.

Upon enablement to further analyze the voice data, the voice recognition system 124 may thereby generate a textual or other simple representation of one or more words in the form of the voice input(s) that is provided by the voice recognition system 124 to a command interpreter 126 of the vehicle 102. In some embodiments, the voice recognition system 124 may generate multiple possible words or phrases such as when the voice recognition system 124 may not resolve the spoken word or phrase with 100% certainty. In such embodiments, the voice recognition system 124 may provide possible phrases in the form of voice inputs to the command interpreter 126. In such embodiments, the voice recognition system 124 may also provide a "confidence value" within the voice inputs for each such possible phrase indicating how confident the voice recognition system 124 is that each possible phrase was the actual phrase spoken.

In one embodiment, the voice recognition system 124 may also be utilized by the application 104 to learn the voices of one or more of the users and store respective voice recognition data files that are associated with the voices of one or more of the respective users. As discussed below, during a configuration phase of the application 104, the task request application 104 may utilize the voice recognition system 124 to learn and store voice data associated with the user(s) within the voice recognition data file(s). The application 104 may be configured to link each voice recognition data file with a stored profile associated with each user that may be created by the respective user during the configuration phase of the application 104.

As discussed below, during an execution phase of the application 104, the task request application 104 may utilize the voice recognition system 124 to further analyze real-time voice data provided by the user(s) via the microphone(s) against the voice recognition data file(s) and may provide comparison details to the application 104 to determine if the user(s) providing the spoken task request is a known (pre-programmed) requestor (e.g., that has used the application 104 to create an associated profile) or an unknown requestor. If the application 104 determines that the user providing the spoken task request is a known requestor, the application 104 may retrieve data from the profile associated with the user that is designated as the requestor to be further utilized to process the task request.

With particular reference to the command interpreter 126, upon receiving data pertaining to the voice input(s) provided by the voice recognition system 124, the command interpreter 126 may analyze the voice input(s) and may perform speech pattern recognition on the voice input(s) to determine one or more statements based on the voice input(s). In some configurations, the command interpreter 126 may communicate with an associated interpreter (not shown) of the portable device 106a used by the user(s) and/or one or more connected devices 146 used by the user(s) to receive the voice input(s). For purposes of simplicity, the command interpreter 126 of the vehicle 102 will be discussed in more detail within this disclosure. However, it is to be appreciated that the disclosure with respect to the functionality of the command interpreter 126 may also apply to the associated interpreter of the portable device 106a and/or the connected device(s) 146.

In one configuration, the one or more statements made by the requestor (within the vehicle 102, to the connected device(s) 146, and/or through the portable device 106a) that may pertain to the spoken task request. As discussed below, the one or more instructions may also be recognized based on the one or more sensor inputs pertaining to one or more unspoken task requests. With respect to the spoken task requests, the command interpreter 126 may utilize multi-modal processing and/or machine learning to perform the speech pattern recognition to determine one or more phrases spoken by the requestor that may pertain to providing the spoken task request. The one or more statements may include one or more inquiries, requests, commands, directions, assertions, and/or details that may be associated with the content of the task request as provided by the requestor. As discussed below, upon determining the one or more statements, the command interpreter 126 may provide the one or more statements to the task request application 104. The application 104 may analyze the one or more statements interpreted by the command interpreter 126 to determine one or more request attributes that may be associated with the task request provided by the requestor.

In one embodiment, the connected device(s) 146 may include one or more devices that are configured to wirelessly connect to the internet cloud 122 and communicate with the components of the system 100. The one or more connected device(s) 146 may include a processor 148 for providing processing and computing functions. The processor 148 may be configured to control one or more respective components of the respective connected device(s) 146. The processor 148 may additionally execute one or more applications include the task request application 104.

In one embodiment, the processor 148 may be operably connected to a respective display screen (not shown) of the connected device(s) 146 that may be capable of receiving inputs from the user(s) and/or the agent(s) directly or through an associated keyboard/touchpad (not shown). The display screen may be utilized to present one or more application HMIs to provide the user(s) and/or the agent(s) with various types of information and/or to receive one or more inputs from the user(s) and/or the agent(s). In one embodiment, the application HMIs may pertain to one or more application interfaces, including one or more user interfaces associated with the task request application 104.

In one embodiment, the processor 148 may also be operably connected to a plurality of sensors 150 of the connected device(s) 146. The plurality of sensors may include, but may not be limited to, weight sensors, camera sensors, LiDAR sensors, and the like and may be configured to output and communicate the one or more sensor inputs to the task request application 104. In one embodiment, the plurality of sensors 150 may be configured to utilize weight logic, image logic, and/or LiDAR logic that is stored in associated memory (not shown) to sense when a requirement is to be fulfilled (e.g., particular object may need to be replaced) and thereby communicate one or more sensor inputs to the application 104.

As an illustrative example, the camera sensors and weight sensors of the plurality of sensors 150 of a connected device 146 configured as a smart refrigerator may be configured to determine when the user(s) has run out of milk or is about to run out of milk based on the weight of a (almost empty vs full) carton of milk or an image of an interior portion of the smart refrigerator in which the carton of milk is normally stored is no longer stored. The plurality of sensors 150 may thereby communicate one or more respective sensor inputs to the task request application 104 that indicate that the user(s) has run out of milk and/or is about to run out of milk. The one or more sensor inputs may be analyzed by the task request application 104 to determine one or more request attributes associated with a task request.

In one embodiment, the connected device(s) 146 may additionally include a respective storage unit 152. The storage unit 152 may store one or more operating systems, applications, associated operating system data, application data, application user interface data, and the like that are executed by the processor 148 and/or one or more applications including the task request application 104. For example, the storage unit 152 may include a profile that is associated with the user(s) using the respective connected device(s) 146. The profile may include the user's name, home address, work place address, additional addresses, telephone number, vehicle information (e.g., VIN), and the like that may be utilized by the application 104 to designate the user(s) of the connected device(s) 146 as a requestor of a particular task request(s). This determination may take place when the user(s) expressly speaks a statement (e.g., request) to the connected device(s) 146 and/or when sensor input(s) are provided by the plurality of sensors 150 of the connected device(s) 146 that may be analyzed to determine one or more request attributes by the task request application 104.

In an exemplary embodiment, the connected device(s) 146 includes a respective communication device 154 that allows the connected device(s) 146 to be wirelessly connected to the internet cloud 122. The communication device 154 may include antennas and components that may be utilized for wired and wireless computer connections and communications via various protocols. The communication device 154 may be capable of providing a wireless system (e.g., IEEE 802.11, IEEE 802.15.1 (Bluetooth®)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In one embodiment, the communication device 154 may provide respective wireless connections (peer-to-peer, Bluetooth®, WAN) with one or more wireless access points to connect the connected device(s) 146 to a Wi-Fi network to exchange communications with one or more external computing environments through the internet cloud 122. In particular, the communication device 154 may be configured to wirelessly communicate with the internet cloud 122 to send and/or receive data packets between the respective connected device(s) 146 and the external server 108. In some configurations, the application 104 may utilize the communications between the connected device(s) 146 and the external server 108 to communicate one or more voice inputs and/or one or more sensor inputs from the connected device(s) 146 to the external server 108 and to provide one or more functions of the application 104.

The communication device 154 may also be utilized to initiate a wireless connection (peer-to-peer, Bluetooth®, WAN) with the communication unit 120 of the vehicle 102 to send and receive electronic signals between one or more of the components of the connected device(s) 146 and the vehicle 102. Additionally, the communication device 154 may also be utilized to initiate a wireless connection with the respective portable devices 106*a*, 106*b* to send and receive electronic signals between one or more components of the connected device(s) 146 and one or more components (discussed below) of the respective portable devices 106*a*, 106*b*.

In some embodiments, the connected device(s) 146 may include one or more speakers (not shown) that may be operably controlled by the processor 148 to output vocal data to the user(s). The vocal data may include one or more vocal statements that are communicated to the user(s) in a conversational style based on one or more voice inputs corresponding to one or more statements communicated by the user(s), one or more sensor inputs corresponding to data sensed by one or more of the plurality of the sensors 150 of the connected device(s) 146, and/or communication of task related data by the task request application 104 to the processor 148.

As an illustrative example, the task request application 104 may operably control the one or more speakers to provide one or more vocal statements to the user(s) based on one or more vocal inputs corresponding to a user's statement "I would like to purchase milk." Based on the analysis of the voice inputs, the task request application 104 may determine one or more request attributes and may communicate with the processor 148 to operably control the one or more speakers to provide a vocal statement in a conversational style stating "I will assign a task to your husband to pick up milk since he is near the store, how does that sound?"

In another illustrative example, the task request application 104 may operably control the one or more speakers to provide one or more vocal statements to the user(s) based on one or more sensor inputs corresponding to weight sensors of the plurality of sensors 150 determining that a carton of milk running low within a smart refrigerator. Upon analyzing the sensor input(s) and determining one or more request attributes, the task request application 104 may communicate with the processor 148 to operably control the one or more speakers to provide a vocal statement "the milk is running low, would you like to have someone pick up some more milk?" In one or more configurations, the task request application 104 may be configured to utilize the voice recognition system and command interpreter of the respective connected device(s) 146 to receive further voice input(s) associated with further statements (e.g., responses) that may be communicated by the user(s) to the connected device(s) 146.

In an exemplary embodiment, the one or more request attributes determined by the task request application 104 may include data pertaining to specific statements within the spoken request provided by the requestor of the task request and/or data pertaining to specific instructions that are derived by the sensor input(s) communicated by the plurality of sensors 150 of the connected device(s) 146. In particular, the one or more request attributes may include, but may not be limited to, a content (e.g., the work to be executed and/or fulfilled) of the task request that may be determined based on the voice input(s) associated with statement(s) provided by the requestor and/or the sensor input(s) provided by the plurality of sensors 150 and a category of the task request that may be assigned based on the voice input(s) associated with the statement(s) provided by the requestor and/or the sensor input(s) provided by the plurality of sensors 150.

The one or more request attributes may additionally include, but may not be limited to a specific agent that may be assigned based on the voice input(s) associated with the statement(s) provided by the requestor and/or the sensor input(s) provided by the plurality of sensors 150, a task execution location to execute the task request that may be assigned based on the voice input(s) associated with the statement(s) provided by the requestor and/or the sensor input(s) provided by the plurality of sensors 150, a task fulfillment location to fulfill the task request that may be assigned based on the voice input(s) associated with the statement(s) provided by the requestor and/or the sensor input(s) provided by the plurality of sensors 150, a priority to execute and/or fulfill the task request that may be determined based on the voice input(s) associated with the statement(s) provided by the requestor and/or the sensor input(s) provided by the plurality of sensors 150, a timeframe in which to execute and/or fulfill the task request that may be determined based on the voice input(s) associated with the statement(s) provided by the requestor and/or the sensor input(s) provided by the plurality of sensors 150, and a price range in which to execute and/or fulfill the task request that may be determined based on the voice input(s) associated with the statement(s) provided by the requestor and/or the sensor input(s) provided by the plurality of sensors 150.

As an illustrative example, the command interpreter of the connected device(s) 146 may determine a statement "I need a ride from my home to the airport for my 9 AM flight" that is provided by the user utilizing the connected device(s) 146 configured as a personal electronic assistant. The command interpreter 126 may provide the statement to the task request application 104 and the application 104 may analyze the statement to determine the one or more request attributes associated with the spoken task request. The task request application 104 may determine that the request attributes include a content of the task request as "ride from home to the airport at 9 AM," a category of the task request as "ride service," a task execution location to execute the task request as "home," a task fulfillment location to fulfill the task request as "airport," a priority to execute and fulfill the task request as "high," a timeframe in which to execute the task (e.g., pick up the requestor) as 3 hours before a flight time of 9 AM, and a timeframe in which to fulfill the task (e.g., travel to airport and drop-off the requestor) as thirty minutes.

With particular reference to the external server 108, the server 108 may house one or more databases that may include, but may not be limited to, a task database 128, a preferred agent database 130, and a point of interest database (POI database) 132. As discussed below, the task database 128 may be populated by one or more components of the application 104. Additionally, the preferred agent database 130 and the POI database 132 may be populated by one or more users of the application 104 during the configuration phase of the application 104 through one or more user interfaces. The populating of the databases 130, 132 may allow the user(s) to provide customization to the task location determination, task assignment, and task creation processes executed by the application 104 during an execution phase of the application 104.

In one embodiment, the task request application 104 may communicate with the external server 108 to store data pertaining to each task request and the one or more request attributes within the task database 128 hosted on the external server 108. In an alternate embodiment, the task request application 104 may also utilize the storage unit 116 and/or the portable device 106a to store data pertaining to the task request and the one or more request attributes.

In an exemplary embodiment, the task database 128 may include records that are each associated with one or more task requests, one or more active tasks that are assigned to an agent to be executed and fulfilled, and one or more fulfilled tasks that have been executed and fulfilled. The task database 128 may include records that are associated with each task request, active task, and/or fulfilled tasks. The records may contain data associated with the one or more attributes of the task request as populated by one or more components of the application 104. Additionally, the records may contain data associated with the task requests, active tasks and/or fulfilled tasks that have been created and assigned based on associated task requests.

FIG. 2 is an illustrative example of a subset of fields of the task database 128 according to an exemplary embodiment. In one configuration, the task database 128 may include records 204 that each correspond to a respective task category 202. In particular, each of the records that pertain to a respective task may include the status of the tasks and/or task requests (e.g., active, fulfilled) that may be included within a status field 206 of the task database 128. As shown in the illustrative example, the active tasks 210a, 210b, 210c are currently active and have been assigned to a particular agent as included within an assigned agent field 208. The fulfilled tasks 210d, 210e may include tasks that an assigned agent that is listed within the assigned agent field 208 has already fulfilled. In particular, the one or more fulfilled tasks are tasks that one or more assigned agents may have previously marked as fulfilled through the portable device 106b used by the one or more respective assigned agents.

As shown in FIG. 2, the task database 128 may contain additional fields that may include a data stamp field 212. The data stamp field 212 may include records that are populated with due dates assigned to each of the tasks. Additionally, the task database 128 may include an execution time stamp field 214 that may pertain to a time that each task has been executed by the assigned agent. For example, with reference to the fulfilled task 210e, the execution time stamp field 214 may include a time that dry cleaning was picked up by the assigned agent Jane Smith. The task database 128 may further include a fulfillment time stamp field 216 that may pertain to a time that each task has been fulfilled by the assigned agent. For example, with reference to the fulfilled task 210e, the fulfillment time stamp field 216 may include a time that dry cleaning was dropped off to the requestor by the assigned agent Jane Smith.

In one or more embodiments, the task request application 104 may communicate with the external server 108 through the internet cloud 122 to access the task database 128 to populate data associated with the one or more request attributes of the task request that may be initiated based on the voice input(s) and/or the sensor input(s). Additionally, the task request application 104 may access the task database 128 to retrieve data associated with other task request, the active tasks and/or the fulfilled tasks to determine one or more request attributes, to assign an agent to execute and/or fulfill the task request and/or to determine locations at which to execute and/or fulfill the task request. It is to be appreciated that the task database 128 may include one or more additional fields pertaining to one or more additional request attributes in addition to those shown in the illustrative example of FIG. 2. For example, one or more additional fields pertaining to a requested agent, a requested priority, a requested timeframe to execute and/or fulfill the task, a requested location at which to execute and/or fulfill the task, and/or a requested price point in which to execute and/or fulfill the task may be included within the task database 128 to be accessed and populated by the application 104.

FIG. 3 includes an illustrative example of the preferred agent database 130 according to an exemplary embodiment. In one embodiment, the preferred agent database 130 may be populated by one or more users of the application 104 via a preferred agent user interface (not shown, discussed in more detail below). In some embodiments, the preferred agent database 130 may be auto-populated with particular data that may pertain to one or more fields of the database 130 by the task request application 104 based on historical data pertaining to one or more of the fulfilled tasks included within the task database 128.

In an exemplary embodiment, the preferred agent database 130 may be populated with a list of preferred agents (e.g., individual agents, family members, friends, groups, businesses) included within a preferred agent field 302 that the user(s) would like to designate as preferred agents to execute and/or fulfill a particular category of task request. The preferred agent database 130 may additionally include one or more agent address fields 304 that may include a primary address and possibly one or more additional addresses that the respective preferred agent may reside at, work at, and/or conduct business from. Additionally, the preferred agent database 130 may include an agent type field 306 that may be populated for each of the preferred agents within corresponding records of the agent field 302 of the preferred agent database 130.

As shown, the agent type field 306 may include records with types of agents that may have a personal relationship (e.g., friend) to the user(s) populating the preferred agent database 130. Additionally, the agent type field 306 may include records with types of agents that may not have a personal relationship to the user(s) and may instead include a third-party vendor (e.g., a business) that is preferred by the user(s). In one configuration, the preferred agent database 130 may additionally include an agent priority field 308 that may include records with a priority assigned to each agent the user designates as a preferred agent. The priorities may be associated with each particular agent and a task category included within records of a task category field 312. For example, as shown within the records 310*a*, 310*b* associated with the agent XYZ Food Delivery (shown in records 310*a*) may include a first priority over YYZ Food Delivery (shown in records 310*b*) as preferred by the user(s). In one or more configurations, the agent priority may be evaluated and may be utilized by the application 104 to assign a particular preferred agent to a particular task request pertaining to a particular category to execute and fulfill the particular task request.

The task category field 312 of the preferred agent database 130 may include records that may be associated with each preferred agent and may be populated to designate the respective agent as preferred for a particular category of task. The priority and task category may allow the application 104 to determine which of the agents to be assigned as the agent to execute and/or fulfill each type of task request based on the content and/or the category of the task request as determined by the request attributes of the task request.

In some configurations, the preferred agent database 130 may additionally include a task timeframe field 314. The task timeframe field 314 may be populated by the user(s) to provide a timeframe that the particular agent may be assigned a task (by the application 104) to execute and fulfill a particular task request. In some cases, the task timeframe field 314 may be tied to the task category field 312 such that a task that pertains to a certain category may only be assigned to a particular preferred agent within a timeframe that is included within the respective record of the task timeframe field 314. It is to be appreciated that the preferred agent database 130 may include one or more additional fields pertaining to one or more agent related details in addition to those shown in the illustrative example of FIG. 3.

FIG. 4 includes an illustrative example of the POI database 132 according to an exemplary embodiment. In an exemplary embodiment, the POI database 132 may be populated by one or more users of the application 104 via a POI user interface (not shown, discussed in more detail below). In some embodiments, the POI database 132 may be auto-populated with particular data that may pertain to one or more fields of the database 132 by the task request application 104 based on historical data pertaining to one or more of the fulfilled tasks included within the task database 128.

The POI database 132 may be populated by the user(s) with one or more preferred points of interest that are included within a POI field 402 of the database 132. As shown, the POI database 132 may include records that indicate one or more points of interest that may be frequently used as task execution and/or task fulfillment locations that are preferred by the user(s). The one or more preferred points of interest included within the records of the POI field 402 may include one or more categories of locations, individual addresses, and/or vendors that may be utilized to facilitate one or more types of task requests.

The one or more preferred points of interest included within the POI field 402 may additionally include one or more subjective points of interest. The subjective point(s) of interest may be associated with one or more locations frequented by the user(s) as a task execution location (e.g., pick up point) or a task fulfillment location (e.g., delivery point) associated with the task request. For instance, the preferred points of interest may include a home address and a workplace address associated with the user's home and workplace. The user(s) may additionally add one or more additional preferred points of interest to the POI database 132 that may be used by the application 104 when determining the task execution location and the task fulfillment location. For example, as shown, the POI database 132 may be populated with records 404*a* pertaining to a favorite grocery store that the user(s) prefers to be utilized when requesting the delivery of groceries.

In certain embodiments, the one of more points of interest listed within the POI field 402 may be used as spoken keywords that may be understood by the command interpreter 126 of the vehicle 102, the command interpreter of the connected device(s) 146, the command interpreter of the portable device 106*a*, and/or one or more components of the application 104 as part of one or more statements of the task request. For example, the requestor may state a task request "Pick up a large cheese pizza from Al's" to a particular connected device 146 configured as a personal electronic assistant and the application 104 may recognize Al's from corresponding records 404*b* of the POI database 132 as the pizza restaurant 'Al's Pizza'.

In one or more embodiments, the POI database 132 may additionally include a POI address field 406 that may include records containing one or more addresses pertaining to one or more locations associated to each respective point(s) of interest. Additionally, the POI database 132 may include a category field 408 that may pertain to a category of each of the points of interest that are included within the POI field 402. In one embodiment, the application 104 may evaluate the category field to determine if a particular point of interest included within the POI database 132 is applicable to be utilized as a task execution location and/or a task fulfillment location based on the content and/or the category of the task request as included within the request attributes of the task request.

As shown in FIG. 4, the POI database 132 may additionally include an hours of operation field 410. The hours of operation field 410 may include records that pertain to one or more applicable points of interest that include timeframes in which the preferred points of interest may be utilized as the task execution location and/or the task fulfillment location upon processing the task request by the application 104. The POI database 132 may further include a category priority field 412 which may be used to prioritize a particular point of interest if multiple preferred points of interest are listed for a particular category.

For example, as shown in FIG. 4, Al's Pizza included at records 404*b* is listed as having a first priority and Mario's Pizza included at records 404*c* is listed as having a second priority with respect to the category of pizza restaurants to be utilized as a task execution location to pick up a pizza per the task request provided by the user (that populated the database 132) and/or sensor input(s) provided by the connected device(s) 146 utilized by the user (that populated the database 132). It is to be appreciated that the POI database 132 may include one or more additional fields pertaining to one or more point of interest related details in addition to those shown in the illustrative example of FIG. 4.

Referring again to FIG. 1A, in an exemplary embodiment, the external server 108 may additionally host and execute a POI agent engine 134. The POI agent engine 134 may be configured to communicate with the task request application 104 to provide one or more third-party vendors that may be assigned as an agent, a task execution location, and/or a task fulfillment location by the application 104 when one or more preferred agents or locations are not provided by the requestor requesting the task request (e.g., are not included within the request attributes of the task request).

In particular, the POI agent engine 134 may provide one or more third-party vendors such as one or more commercial service providers and/or one or more locations (e.g., addresses) that may be assigned as the agent to execute or fulfill the task request and/or the location at which the task request may be executed and/or fulfilled. The POI agent engine 134 may be configured to communicate with one or more third-party vendors (e.g., service providers, delivery services, stores, restaurants, places of business) that may or may not be included within the preferred agent database 130 and/or the POI database 132.

In some configurations, the POI agent engine 134 may also automatically receive data by one or more third-party internet services/applications (e.g., user review sites/applications pertaining to shops, restaurants, hotels, ride services, businesses, etc.) pertaining to one or more third-party agents and/or locations. As an illustrative example, the POI agent engine 134 may provide a list of pizza restaurants that may be utilized as a delivery agent to deliver a pizza to the requestor and/or a task execution location to pick up the pizza for delivery to the requestor. The POI agent engine 134 may be used in such a scenario if the user(s) has not requested a particular agent or a particular task execution location within the spoken task request and/or the user had not populated the preferred agent database 130 with an applicable preferred agent and/or the POI database 132 with an applicable preferred point of interest.

It is contemplated that the task request application 104 may additionally utilize the POI agent engine 134 in scenarios in which the user(s) is traveling and may be located outside of an area (e.g., in another city far from the user's home) in which the user may not be aware of one or more agents that may execute and/or fulfill a task request and/or one or more locations at which the task request may be executed and/or fulfilled. For example, the application 104 may utilize the POI agent engine 134 to determine one or more ride service providers that may be used to provide ride services to and/or from one location to another within a particular city in which the requestor is traveling and is requesting a ride.

In one embodiment, the external server 108 may also host and execute a pricing engine 136. The pricing engine 136 may be configured to communicate with the task request application 104 to provide one or more pricing schemes/price points that may be applicable to one or more third-party vendors (included within the preferred agent database 130 or provided by the POI agent engine 134) that may be assigned as an agent to execute and fulfill a task request, a task execution location, and/or a task fulfillment location.

In particular, the pricing engine 136 may be configured to communicate with various vendors through the internet cloud 122 to obtain one or more pricing schemes/price points that may pertain to one or more goods and/or services provided by the third-party vendors. The pricing engine 136 may obtain real-time pricing schemes that may be applicable to price points that are charged by vendors at particular timeframes. For example, the pricing engine 136 may obtain one or more price points utilized by one or more ride service providers at one or more timeframes (e.g., evening, weekend, weekday, peak, off-peak). As discussed below, the task request application 104 may utilize the pricing engine 136 to obtain pricing schemes/price points to process particular task requests that may include one or more price related attributes.

With reference to the portable devices 106a, 106b used by the user(s) and the agent(s), the portable devices 106a, 106b may be used to provide inputs and receive data to/from the task request application 104. In alternate embodiments, stand-alone computing devices (not shown) may also be used by the user(s) and/or the agent(s) to provide inputs and receive data to/from the task request application 104. The portable devices 106a, 106b may include, but may not be limited to, mobile devices such as mobile phones or smart phones, hand held devices such as tablets, laptops, e-readers, etc. The portable devices 106a, 106b may include respective processors 138a, 138b for providing processing and computing functions. The processors 138a, 138b may be configured to control one or more respective components of the respective portable devices 106a, 106b. The processors 138a, 138b may additionally execute one or more applications include the task request application 104.

The portable devices 106a, 106b may also include respective display screens (not shown) that are operably controlled by the respective processors 138a, 138b and may be capable of receiving inputs from the user(s) and/or the agent(s) directly or through an associated keyboard/touchpad (not shown). The display screens may be utilized to present one or more application HMIs to provide the user(s) and/or the agent(s) with various types of information and/or to receive one or more inputs from the user(s) and/or the agent(s). In one embodiment, the application HMIs may pertain to one or more application interfaces, including one or more user interfaces associated with the task request application 104.

As discussed below, one or more user interfaces may be presented to the user(s) through the display screen of the portable device 106a (or the stand-alone computing device) and/or the display unit 114 of the vehicle 102 during the configuration phase and the execution phase of the application 104. Additionally, one or more user interfaces may be presented to the agent(s) through the display screen of the portable device 106b (or the stand-alone computing device) during the configuration phase and/or the execution phase of the application 104.

In one embodiment, the processors 138a, 138b may be operably connected to respective storage units 140a, 140b of the respective portable devices 106a, 106b. The storage units 140a, 140b may store one or more operating systems, applications, associated operating system data, application data, application user interface data, and the like that are executed by the respective processors 138a, 138b and/or one or more applications including the task request application 104. For example, the storage unit 134a of the portable device 106a may include a profile that is associated with the user(s) using the portable device 106a. The profile may include the user's name, home address, work place address, additional addresses, telephone number, VIN, and the like that may be utilized by the application 104. Additionally, the storage unit 134b of the portable devices 108b may include a profile that is associated with the agent(s). The profile may include the agent's name, home address, business address, additional addresses, hours of operation, price data associated with fees (e.g., delivery fees, service fees), and the like that may be utilized by the application 104.

In one embodiment, the storage units 140a, 140b may additionally store map data that may be accessed by location sensors 142a, 142b of the respective portable devices 106a, 106b. The map data may be accessed by the location sensors 142a, 142b to determine directional data, distance data, environmental data, and point of interest data pertaining to one or more locations at which the respective portable devices 106a, 106b and consequently the user(s) and the agent(s) using the respective portable devices 106a, 106b may be located.

The map data may include data that pertains to geographical maps and satellite/aerial imagery of one or more locations at which the respective portable devices 106a, 106b are located. As discussed below, in some circumstances, the task request application 104 may communicate with the location sensors 136a to determine a current location of the portable device 106a and the requestor that may be used as the task execution location to execute the task (e.g., requestor pickup location) or the task fulfillment location to fulfill the task (e.g., package drop off location).

In some configurations, the task request application 104 may communicate with the location sensors 136b to determine a current location of the one or more agents to determine if one of the one or more agents is located at a location that allows the task to be fulfilled within a particular timeframe. This determination may be used to assign a particular agent to execute and fulfill the task request requested by the requestor and/or the connected device(s) 146 utilized by the user(s). In one configuration, the task request application may communicate with the location sensors 136b to determine that a current location of an agent (e.g., a person who has a personal relationship with the requestor) who lives with the requestor to thereby assign the particular agent to execute and fulfill the task request requested by the requestor and/or the connected device(s) 146 utilized by the user(s). In some embodiments, the current location of the portable device 106b used by an assigned agent (assigned to execute and/or fulfill a task request) may be used to provide live updates to the requestor and/or the connected device(s) 146 of the task request. The live updates may pertain to an estimated real-time location of the agent assigned to execute and/or fulfill the task as the agent is in the process of executing and/or fulfilling the task.

In an exemplary embodiment, the processors 138a, 138b may additionally be operably connected to respective communication devices 144a, 144b of the respective portable devices 106a, 106b. The communication devices 144a, 144b may include antennas and components that may be utilized for wired and wireless computer connections and communications via various protocols. The communication devices 144a, 144b may be capable of providing a wireless system (e.g., IEEE 802.11, IEEE 802.15.1 (Bluetooth®)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In one embodiment, the communication devices 144a, 144b may provide respective wireless connections (peer-to-peer, Bluetooth®, WAN) with one or more wireless access points to connect the portable devices 106a, 106b to a Wi-Fi network to exchange communications with one or more external computing environments through the internet cloud 122. In particular, the communication devices 144a, 144b may be configured to wirelessly communicate with the internet cloud 122 to send and/or receive data packets between the respective portable devices 106a, 106b and the external server 108. As discussed below, the application 104 may utilize the communications between the portable devices 106a, 106b and the external server 108 to provide one or more functions of the application 104. The communication devices 144a, 144b may be utilized to initiate a wireless connection (peer-to-peer, Bluetooth®, WAN) with the communication unit 120 of the vehicle 102 to send and receive electronic signals between one or more of the components of the respective portable devices 106a, 106b and one or more components of the vehicle 102. The communication devices 144a, 144b may also be utilized to initiate a wireless connection (peer-to-peer, Bluetooth®, WAN) with the communication device 154 of the connected device(s) 146 to send and receive electronic signals between one or more of the components of the respective portable devices 106a, 106b and one or more components of the connected device(s) 146.

II. The Task Request Processing Application and Related Methods

The components of the task request application 104 will now be described according to an exemplary embodiment and with reference to FIG. 1B, a schematic view of an exemplary embodiment of a task request processing application according to an exemplary embodiment. In an exemplary embodiment, the task request application 104 may be stored on the storage unit 116 of the vehicle 102, the storage unit 152 of the connected device(s) 146, the storage unit 140a of the portable device 106a, and/or the storage unit 140b of the portable device 104b. In additional embodiments, the task request application 104 may be stored on the memory of the external server 108 and may be accessed by the communication unit 120 to be executed by the ECU 110 and/or the head unit 112. Additionally, the application 104 may be accessed by the communication devices 144a, 144b of each of the respective portable devices 106a, 106b to be executed by the respective processors 138a, 138b.

In an exemplary embodiment, the configuration phase of the application 104 may be automatically executed during an initial execution of the application 104. In some embodiments, the configuration phase may be manually executed based on an input of a configuration phase execution user interface icon that may be presented on a task request start screen user interface (not shown) that may be presented via the display unit 114 and/or the display screen of the portable device 106a. During the configuration phase of the application 104, one or more configuration user interfaces may be presented to the user(s) of the application 104.

In particular, during the configuration phase of the application 104, a particular user of the application 104 may be provided with a profile setup user interface (not shown) that allows the user to create a profile that may be used by the application 104 (during the execution phase of the application 104) to identify the user as a requestor of the task request when applicable (based on vocal input(s) associated with the user's statement(s)) and/or identify one or more connected devices(s) 146 that may be utilized by the particular user to provide a task request (based on vocal input(s) and/or sensor input(s)). The profile setup user interface may include one or more fields that allow the user to add profile information that may include, but may not be limited to, a username/password login, the user's name, home address, work place address, additional addresses, telephone number, VIN, payment information (e.g., credit card numbers), a respective device identification (serial number, internet protocol address, physical address where the connected device(s) 146 is utilized) of the one or more connected devices 146 used by the user, and the like that may be utilized by the application 104 upon designating the particular user as the requestor based on by statement(s) and/or data provided by the connected device(s) 146 utilized by the user associated with one or more vocal inputs and/or one or more sensor inputs (that may apply to sensed data sensed by the plurality of sensors 150 of the connected device(s) 146.

Upon creation of the profile, the particular user may be presented with a user interface prompt that may be inputted to train the application 104 with the user's voice. In one embodiment, if the user inputs the user interface prompt, the application 104 may communicate with the voice recognition system 124 to start a training session to train the voice recognition system 124 to recognize the particular user's voice. The application 104 may thereby present the particular user with an interface that asks the user to repeat one or more slogans and/or key words that may be used to learn the user's voice. As discussed, the voice recognition system 124 may be learn the user's voice and may store a voice recognition data files that are associated with the voice of the user on the external server 108 and/or the storage unit 116 of the vehicle 102. The application 104 may be configured to link each voice recognition data file with a stored profile associated with the user as created through the profile setup user interface.

As discussed below, during the execution phase of the application 104, the task request application 104 may utilize the voice recognition system 124 to further analyze real-time voice data provided by the microphone(s) (as the user(s) provides the spoken task request) against the voice recognition data file(s) (e.g., that include data associated to the voice of the user) to determine if the user(s) providing a spoken task request is a known (pre-programmed) requestor that has setup an associated profile or an unknown requestor to the application 104 that has not setup an associated profile (during the configuration phase of the application 104. Based on voice recognition conducted by the voice recognition system 124, the user providing the spoken task request may be identified as a requestor and information pertaining to the requestor may be retrieved from the user's associated profile.

In one or more embodiments, within the configuration phase, upon creation of the profile associated with a particular user, the application 104 may present the user with a setup user interface that includes a preferred agent user interface input icon and a POI user interface input icon. The preferred agent user interface input icon may be inputted by the user to provide inputs via the preferred agent user interface to manually populate the preferred agent database 130 hosted on the external server 108. In one embodiment, the preferred agent user interface may include one or more user input boxes (e.g., text input boxes, menu drop down boxes, menu selection boxes) that are associated to each of the fields of the preferred agent database 130, discussed above.

The particular user may update one or more user interface boxes to create records on the preferred agent database 130. The one or more user interface boxes may be associated with one or more fields of the preferred agent database 130 that may include, but may not be limited to, the name of each preferred agent, the address of each preferred agent, the agent type associated with each preferred agent (e.g., family, son, friend, third-party), the task timeframe associated with each preferred agent (e.g., timeframe in which the user(s) would like to have the preferred agent assigned), and one or more task categories that the user would like each preferred agent to execute and fulfill. It is to be appreciated that the preferred agent user interface may include one or more additional user interface boxes that may be used to add additional data to additional contemplated fields of the preferred agent database 130. Updating of the preferred agent user interface thereby allows the user to input one or more preferred agents that the user would like the application 104 to assign for particular task requests that may fall within particular task categories, when a specific agent is not specified within the task request.

The POI user interface input icon may be inputted by the user to provide inputs via the preferred agent user interface to manually populate the POI database 132 hosted on the external server 108. In one embodiment, the POI user interface may include one or more user input boxes (e.g., text input boxes, menu drop down boxes, menu selection boxes) that are associated with each of the fields of the POI database 132, discussed above. The user may update one or more user interface boxes to create records on the POI database 132.

The one or more user interface boxes may be associated with one or more fields of the POI database 132 that may include, but may not be limited to, the name of each point of interest, the address of each point of interest, the category associated with each point of interest (e.g., home, grocery store, post office), the hours of operation (if applicable) that are associated with each point of interest, and one or more point of interest category priorities that the user would like the application 104 to use when assigning the task execution location and/or the task fulfillment location for each task request.

It is to be appreciated that the POI user interface may include one or more additional user interface boxes that may be used to add additional data to additional contemplated fields of the POI database 132. Updating of the POI user interface thereby allows the user to input one or more points of interest that the user may like the application 104 to assign as the task execution location and/or the task fulfillment location when the task execution location and/or the task fulfillment location are not specified within the task request.

In one embodiment, during the configuration phase of the application 104 (e.g., based on the user enabling the configuration phase of the application 104), the user (later designated as a requestor) may input an item list user interface input icon. Upon inputting of the item list user interface icon, the application 104 may present the user with an item list user interface (not shown) via the display unit 114 and/or the portable device 106a. The item list user interface may include one or more user input boxes (e.g., text input boxes, menu drop down boxes, menu selection boxes) that allow the user to populate an item list of goods that the user would like to acquire. For example, the item list user interface may be populated with a grocery list of items that the user may utilize to remind themselves of items to be picked up at a grocery store. Upon populating the item list, the list may be stored by the application 104 on the memory of the external server 108, the storage unit 152 of the connected device(s) 146, the storage unit 116 of the vehicle 102 and/or the storage unit 140a of the portable device 106a.

In one or more configurations, during the execution phase of the application 104, the user designated as a requestor may access the item list user interface (e.g., through input of a presented item list user interface input icon) to analyze the list and utilize the list when picking up one or more goods. The user may manually update the one or more items of the item list and mark them as acquired based on the acquisition (e.g., picking up by the user) of the respective item. In another embodiment, during the acquisition of items that may be included within the item list, the user may utilize a camera (not shown) of the portable device 106a to scan stock keeping units (SKUs) associated with the items that the user would like to mark as acquired on the list. The application 104 may be configured to communicate with the external server 108 to utilize item data through one or more web services (e.g., internet/web search engines) to acquire information pertaining to each item scanned. The application 104 may thereby access the item list and may electronically mark one or more items picked up/scanned by the user as acquired.

In one embodiment, the application 104 may be configured to access the location sensors 142a of the portable device 106*a* and/or the navigation system 118 of the vehicle 102 to determine when the user departs a location at which one or more of the items on the item list are marked as acquired. If it is determined by the application 104 that the user departs the location at which one or more items are marked are acquired, the application 104 may access the item list to determine if any remaining items may be included within the list. Upon analysis of the list, if the application 104 determines that one or more items are remaining on the list and are not marked as acquired, the application 104 may present a reminder user interface (not shown) to the user via the display unit 114 and/or the portable device 106*a*, to remind the user that one or more items of the item list have not been picked up and/or may have been forgotten by the user. The reminder user interface may also present the user with an item location recommendation user interface input icon and an agent recommendation user interface input icon.

In one or more embodiments, if the user inputs the item location recommendation user interface input icon, the application 104 may determine the user's real-time location based on data provided by the location sensors 142*a* and/or the navigation system 118 of the vehicle 102. Upon determining the real-time location of the vehicle 102, the application 104 may access the POI database 132 to determine one or more points of interest (e.g., stores) that may be located within a predetermined distance (e.g., 2 miles) of the user and that may include the one or more items (remaining items of the items list) to be acquired by the user.

The application 104 may additionally communicate with the POI agent engine 134 to determine one or more points of interest that may be located at the predetermined distance of the user and may include the one or more items (remaining items of the item list) to be acquired by the user. The application 104 may thereby present one or more locations that are located within the predetermined distance to the user that may be selected by the user to acquire the one or more items to be acquired. It is to be appreciated that the application 104 may additionally and/or alternatively execute one or more processes described in detail below to utilize and/or assign one or more locations that are located within the predetermined distance of the connected device(s) 146 at which the one or more items may be acquired to be further provided within a task that is to be sent to an assigned agent.

In one embodiment, if the user inputs the agent recommendation user interface input icon, the application 104 may determine the user's real-time location based on data provided by the location sensors 142*a* and/or the navigation system 118 of the vehicle 102. In an alternate embodiment, the application 104 may determine the location of the connected device(s) 146 based on a physical address and/or Internet protocol address associated with the connected device(s) 146, as stored with the profile associated with the user. Upon determining the real-time location of the vehicle 102 or the location of the connected device(s) 146, the application 104 may access the preferred agent database 130 to determine one or more preferred agents that may be located within a predetermined distance (e.g., 5 miles) of the user and/or the connected device(s) 146. In another embodiment, the application 104 may access the preferred agent database 130 to determine the location (as determined by the application 104) that may include the one or more items (remaining items of the items list) to be acquired by the user.

The application 104 may additionally communicate with the POI agent engine 134 and/or may communicate with the location sensors 142*b* of the portable device 106*b* used by the agent(s) to determine one or more agents that may be located (e.g., real time location of the one or more agents) at the predetermined distance of the user, the predetermined distance of the connected device(s) 146 and/or one or more locations that may include the one or more items (remaining items of the item list) to be acquired by the user. The application 104 may thereby present one or more agents that are located within the predetermined distance to the user and/or the locations that may be selected by the user to acquire the one or more items to be acquired (as discussed above). It is to be appreciated that the application 104 may additionally and/or alternatively execute one or more processes described in detail below to utilize and/or assign one or more agents to acquire the one or more items at one or more utilized and/or assigned locations at which the one or more items may be acquired to be further provided within a task that is to be executed and/or fulfilled by the assigned agent(s).

Figure 1B:
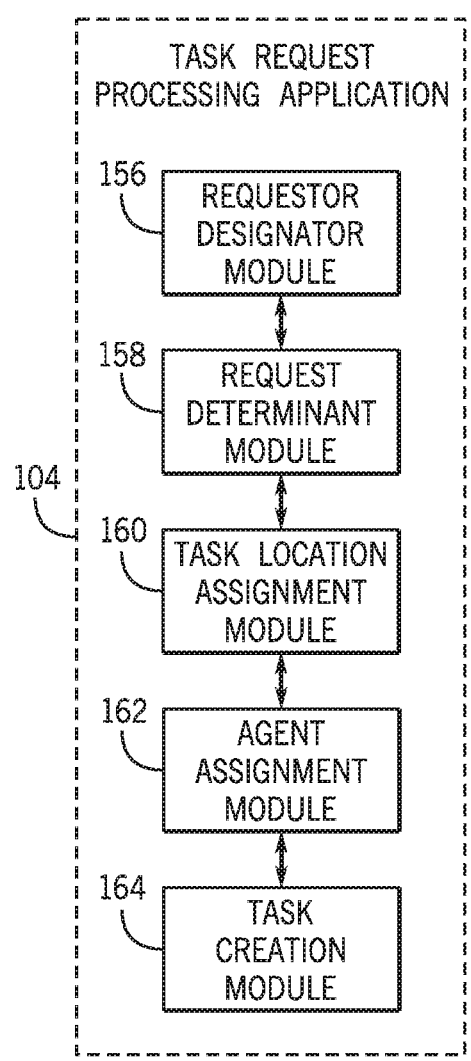
FIG. 1B is a schematic view of an exemplary embodiment of a task request processing application according to an exemplary embodiment of the present disclosure.

With continued reference to FIG. 1B and with particular reference to the components of the task request application 104 utilized during the execution phase of the application 104, the application 104 may include a plurality of modules that may be utilized to process each task request provided by the user(s). The plurality of modules may include, but may not be limited to, a requestor designation module 156, a request determinant module 158, a task location assignment module 160, an agent assignment module 162, and a task creation module 164, discussed in more detail below. It is to be appreciated that the task request application 104 may include additional modules and/or sub-modules that are configured to execute one or more functions of the application 104.

Figure 5:
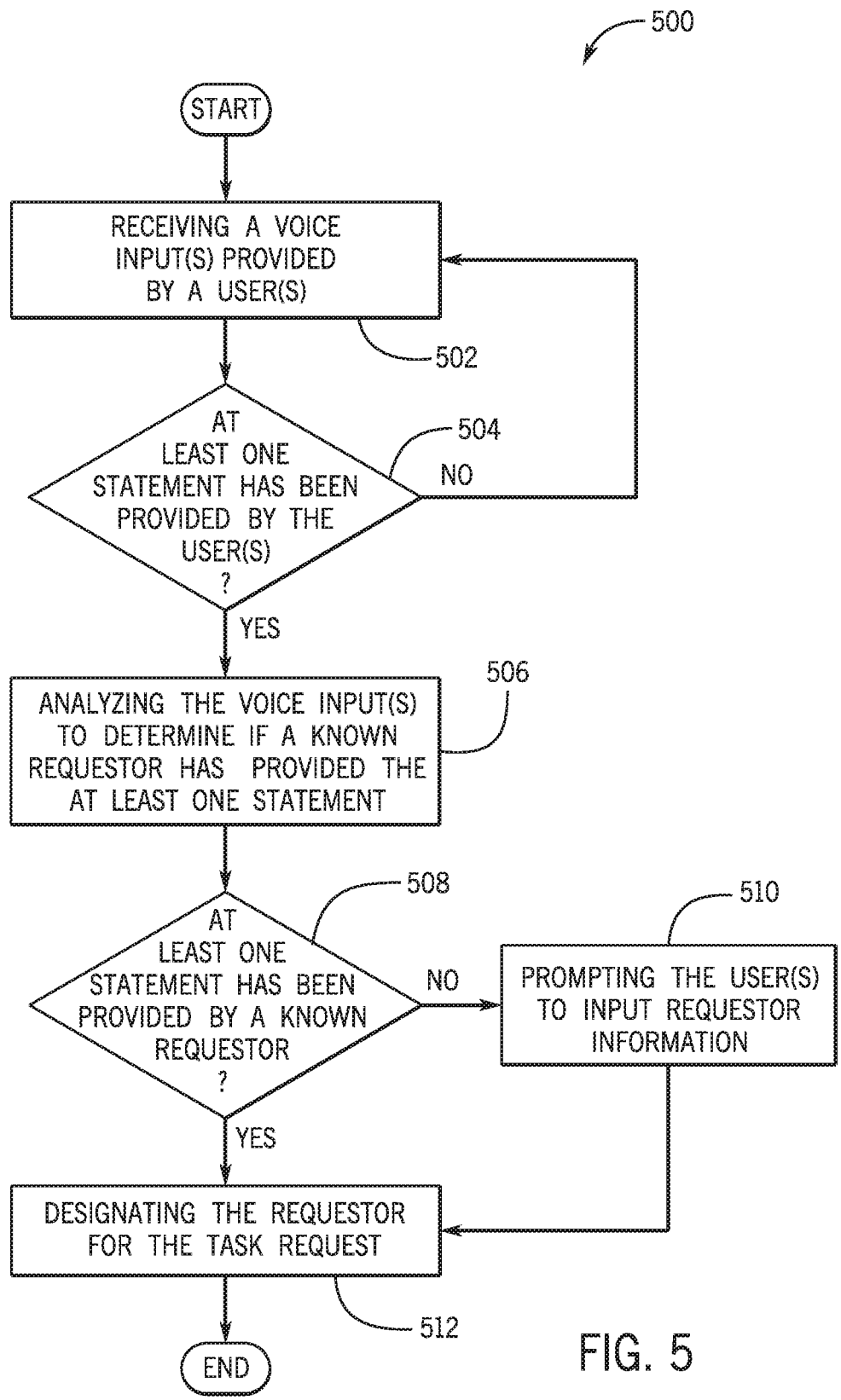
FIG. 5 is a process flow diagram of a method for designating a requestor of a task request based on voice input(s) provided by a user(s) as executed by a requestor designated module of a task request application according to an exemplary embodiment.

FIG. 5 is a process flow diagram of a method 500 for designating the requestor of a task request based on voice input(s) provided by a user(s) as executed by the requestor designation module 156 of the task request application 104 according to an exemplary embodiment. FIG. 5 will be described with reference to the components of FIG. 1, though it is to be appreciated that the method 500 of FIG. 5 may be used with other systems/components. In an exemplary embodiment, the requestor designation module 156 may execute the method 500 to designate the requestor of each spoken task request as received within the vehicle 102 and/or through the portable device 106*a*.

The method 500 may begin at block 502, wherein the method 500 may include receiving a voice input(s) provided by a user(s). In an exemplary embodiment, the voice recognition system 124 may be enabled to analyze the voice data sensed by the microphone(s) to locate human speech patterns upon receiving an activation signal from the application 104. As discussed above, the application 104 may present a task request user interface icon that may be inputted by one of the one or more users of the application 104 to provide a spoken task request to the application 104.

In an additional embodiment, the voice recognition system 124 may be configured to sense the trigger phrase that may be spoken by one of the one or more users of the application 104. In some circumstances, the voice recognition system of the connected device(s) 146 may be configured to sense the trigger phrase that may be spoken by one of the one or more users of the application 104. Upon receipt of the input to the task request user interface icon or upon sensing the trigger phrase being spoken, the voice recognition system 124 may be enabled to analyze voice data sensed by the microphone(s). The voice recognition system 124 may be configured to continue to receive one or more voice inputs through the microphone(s) and may determine a textual or other simple representation of one or more words in the form of the voice input(s).

In an alternate embodiment, if the plurality of sensors 150 determine that a requirement is to be fulfilled (e.g., milk is needed), the connected device(s) 146 may vocally (in a conversational style) confirm with the user(s) to determine if the user(s) would like to request a respective task (e.g., to have milk picked up). In one embodiment, if the user(s) provide an affirmative response, the voice recognition system 124 may be enabled to analyze voice data sensed by the microphone(s). The voice recognition system 124 may be configured to continue to receive one or more voice inputs through the microphone(s) and may determine a textual or other simple representation of one or more words in the form of the voice input(s).

The method 500 may proceed to block 504, wherein the method 500 may include determining if at least one statement has been provided by the user(s). In one embodiment, upon receiving the voice input(s), the voice recognition system 124 may communicate respective data pertaining to the voice input(s) to the command interpreter 126 of the vehicle 102. Upon receiving data pertaining to the voice input(s) provided by the voice recognition system 124, the command interpreter 126 may analyze the voice input(s) to determine one or more statements based on the voice input(s). The one or more statements made by the user(s) (within the vehicle 102, to the connected device(s) 146, and/or through the portable device 106*a*) may pertain to the spoken task request. In particular, the command interpreter 126 may utilize multimodal processing and/or machine learning to determine one or more phrases spoken by the requestor that may pertain to providing the spoken task request.

If it is determined that at least one statement has been provided by the user(s) (at block 504), the method 500 may proceed to block 506, wherein the method 500 may include analyzing the voice input(s) to determine if a known requestor has provided the at least one statement. As stated above, during the configuration phrase, the task request application 104 may utilize the voice recognition system 124 to learn and store voice data associated with one or more particular users of the application 104 within the voice recognition data file(s) on the storage unit 116 of the vehicle 102. The application 104 may be configured to link each voice recognition data file with a stored profile of each particular user that is setup as a requestor during the configuration phase of the application 104.

In an exemplary embodiment, upon receiving the voice input(s) provided by the user(s) (at block 502), and determining that at least one statement has been provided by the user(s) (at block 504), the requestor designation module 156 may utilize the voice recognition system 124 to further analyze real-time voice input(s) provided by the microphone(s) based on the statements spoken by the user(s). The real-time voice data may be compared against the voice recognition data file(s).

The method 500 may proceed to block 508, wherein the method 500 may include determining if at least one statement has been provided by a known requestor (e.g., that has previously created a profile within the configuration phase of the application 104). In one embodiment, upon comparing the real-time voice data against the voice recognition file(s), the voice recognition system 124 may provide comparison information to the requestor designation module 156. The requestor designation module 156 may analyze the comparison information to determine if the user(s) providing the spoken task request is a known (pre-programmed) requestor or an unknown requestor.

More specifically, the comparison information may include a number of vocal pattern matches between the real-time voice data and the voice recognition file(s). The requestor designation module 156 may thereby determine that the user(s) providing the spoken task request is a known requestor if the number of vocal pattern matches between the real-time voice data and the voice recognition file(s) meet a predetermined value (e.g., within an error threshold). Conversely, the requestor designation module 156 may determine that the user(s) providing the spoken task request is an unknown requestor if the number of vocal pattern matches between the real-time voice data and the voice recognition file(s) fail to meet the predetermined value.

If it is determined that at least one statement has not been provided by a known requestor (at block 508), the method 500 may proceed to block 510, wherein the method 500 may include prompting the user(s) to input requestor information. In one embodiment, upon the requestor designation module 156 determining that the user(s) providing the spoken task request is an unknown requestor based on the analysis of the voice input(s), the application 104 may communicate with the head unit 112 and/or the processor 138*a* to present a login user interface to the unknown requestor via the display unit 114 of the vehicle 102, the portable device 106*a*, and/or the connected device(s) 146.

In one embodiment, the login user interface may include a username/password prompt and a guest login prompt. The username/password prompt may be utilized by a user(s) that has previously setup a profile during the configuration phase of the application 104. In one configuration, if the unknown requestor inputs a username/password, the requestor designation module 156 may confirm if the username/password combination matches with a pre-programmed username/password stored within one of the one or more profiles created during the configuration phase of the application 104. If a match occurs, the requestor designation module 156 may modify the designation of the unknown requestor to a known requestor based on the associated profile. This functionality may ensure that the pre-programmed user(s) of the application 104 may be designated as a known requestor in the instance that their voice is not identified by the requestor designation module 156 during analysis of the voice input(s) (at block 506).

In one or more embodiments, the guest prompt of the login user interface may be utilized for a user(s) that has not previously used the application 104 to setup a profile. In other words, the guest prompt may be used by one or more user's that are not a pre-programmed user(s) to utilize the functions of the application 104. In one configuration, the user(s) may input a guest login user interface icon to utilize the guest prompt. Upon inputting the guest login user interface icon, the requestor designation module 156 may present a guest setup user interface that allows the guest user(s) to input information that may be used to identify the user(s). For example, the guest setup user interface may allow the guest user(s) to input information related to the guest user(s) that may include, but may not be limited to, a full name, an address or location from which the guest user(s) is providing the task request, and a telephone number.

If the requestor designation module 156 determines that the user providing the spoken task request is a known requestor (at block 508) and/or identifies the unknown requestor based on the input of requestor information (at block 510), the method may proceed to block 512, wherein the method 500 may include designating the requestor for a task(s). In one embodiment, if the requestor designation module 156 determines that the at least one statement is provided by a known requestor based on the analysis of the voice input(s) or input of the known user's login credentials, the requestor designation module 156 may retrieve data from the profile associated with the known user. The requestor designation module 156 may thereby utilize the known user's name and associated information to designate the known user as the requestor of the task request. In another embodiment, if the unknown user utilizes the guest prompt and inputs identifying information through the guest setup user interface, the requestor designation module 156 may utilize the identifying information pertaining to the guest user to designate the guest user as the requestor of the task request.

In an alternate embodiment, the requestor designation module 156 may be configured to designate the user that is utilizing the connected device(s) 146 as the requestor of the task request. In particular, if the requestor designation module 156 determines that the application 104 has received one or more sensor inputs from the plurality of sensors 150 or the connected device(s) 146, the requestor designation module 156 may be configured to access the storage unit 152 of the connected device(s) 146 and analyze the profile to determine information pertaining to the user utilizing the connected device(s) 146. The requestor designation module 156 may designate the user as the requestor based on the task request being initiated due to sensor input(s) communicated from the connected device(s) 146.

With particular reference to the request determinant module 158 of the task request application 104, the module 158 may be configured determine the content and category of the task request and one or more request attributes that are included within the task request. In one embodiment, the request determinant module 158 may be configured to analyze and determine the content/category and one or more request attributes of the task request by analyzing the voice input(s) and parsing one or more statements included spoken by the user(s) into the one or more request attributes that may be further analyzed by the application 104 to process the task request provided by the designated requestor. In some embodiments, the request determinant module 158 may additionally be configured to analyze and determine the content/category and one or more request attributes of the task request by analyzing the sensor input(s) provided by the plurality of sensors 150 of the connected device(s) 146 to determine the content/category and one or more request attributes of the task request.

In some instances the request determinant module 158 may determine whether a content/category of the task request is a specific content/category that includes picking something or someone up for the home of the requester. The application 104 may thereby assign a particular agent to execute and fulfill a task request that includes assigning someone who lives with the requester when the specific content/category includes picking up something or someone at the home of the requestor. The application 104 may also assign a particular task execution location as the home where something or someone is to be picked up. In additional instances, the request determinant module 158 may determine whether a content/category of the task request includes assigning someone who lives with the requestor when the specific content/category includes dropping off something or someone at the home of the requestor. The application 104 may also assign a particular task fulfillment location as the home where something or someone is to be dropped off.

In an exemplary embodiment, upon the requestor designation module 156 designating the requestor, the module 156 may communicate respective data to the request determinant module 158. The request determinant module 158 may responsively communicate with the external server 108 to access the task database 128. Upon accessing the task database 128, the request determinant module 158 may create records associated with the task request. As discussed below, the records may be populated with data pertaining to the content of the task request and associated with one or more fields that pertain to one or more of the request attributes of the task request as provided by or associated with the designated requestor.

FIG. 6 is a process flow diagram of a method 600 for determining one or more request attributes associated with the task request by the request determinant module 158 of the task request application 104 according to an exemplary embodiment. FIG. 6 will be described with reference to the components of FIG. 1, though it is to be appreciated that the method 600 of FIG. 6 may be used with other systems/components. The method 600 may begin at block 602, wherein the method 600 may include analyzing the at least one statement to determine a content and category of the task request provided by the requestor.

In one embodiment, upon receiving data pertaining to the voice input(s) provided by the voice recognition system 124, the command interpreter 126 may analyze the voice input(s) to determine one or more of the statements based on the voice input(s). In particular, the command interpreter 126 may utilize multimodal processing and/or machine learning to determine one or more phrases spoken by the requestor that may pertain to a spoken task request. The one or more statements may include one or more inquiries, requests, commands, directions, assertions, and/or details that may be associated with the content of the task request as provided by the requestor. For example, the one or more statements may include an assertion by the requestor stating "I have run out of milk."

In an exemplary embodiment, the command interpreter 126 may provide data associated with the one or more statements to the request determinant module 158. The request determinant module 158 may analyze the data associated with the one or more statements to determine the content of the task request provided by the requestor. More specifically, the content of the task request may pertain to the type of task (e.g., work) that is being requested by the requestor. In one configuration, the request determinant module 158 may execute a task request logic (not shown) that is executed by the external server 108. The task request logic may be programmed with one or more stored key words (that may be stored on the memory of the external server 108) that may pertain to one or more types of commonly utilized tasks. In particular, the module 158 may execute the task request logic to determine any commonly utilized tasks that may include words and/or phrases that may correspond to the type of task requested by the requestor.

In additional embodiments, the request determinant module 158 may access the task database to analyze records associated with one or more active and/or fulfilled tasks. Such records may contain certain task descriptions that were previously requested and that may be used to determine the content of the current task request. In one or more embodiments, the request determinant module 158 may additionally determine the category of the task request based on the determined content of the task request. In particular, the request determinant module 158 may execute the task request logic to determine a category that may pertain to the content of the task request.

As an illustrative example, if the requestor requests to "please pick up groceries per the attached grocery list", the request determinant module 158 may determine the content of the task request as "picking up of groceries per an attached list" and may further determine that the category that pertains to the content is 'Pickup and Delivery'. In one configuration, upon determining the content and the category of the task request, the request determinant module 158 may access the task database 128 and may update the records pertaining to the task request with the content and the category of the task.

In an alternate embodiment, if the plurality of sensors 150 of the connected device(s) 146 determine that a requirement is to be fulfilled, the request determinant module 158 may additionally be configured to analyze and determine the content/category and one or more request attributes of the task request by analyzing the sensor input(s) provided by the plurality of sensors 150 of the connected device(s) 146. In particular, the request determinant module 158 may be configured to determine the content/category and one or more request attributes of the task request by analyzing specific values and categorization (e.g., weight of milk carton) of each of the sensor input(s) and converting the sensor input(s) into the one or more request attributes that may be further analyzed by the application 104 to process the task request provided by the designated requestor.

The method 600 may proceed to block 604, wherein the method 600 may include analyzing the at least one statement to determine if the requestor has requested a specific agent to execute and/or fulfill the task request. In one embodiment, the request determinant module 158 may communicate with the command interpreter 126 to provide speech pattern recognition with respect to the one or more statements determined to be provided by the requestor. The speech pattern recognition may be utilized to determine if the requester requested (e.g., explicitly stated or implied) a specific agent that the requestor would like the task request to be handled by. In some configurations, the request determinant module 158 may also execute the task request logic to utilize one or more stored common names and/or stored common phrases that may pertain to one or more types of common names, relationships, and/or vendor types that may apply to one or more agents. The task request logic may provide a match to a name or a phrase (e.g., Bob, Dad, Mom) that may be applied to determine the specific agent requested by the requestor.

In an additional embodiment, the request determinant module 158 may access the task database 128 to analyze records associated with one or more active tasks and/or fulfilled tasks that may contain agent names that were previously assigned tasks. Such records may contain names that may match with one or more names or phrases spoken by the requestor pertaining to a specifically requested agent. In an alternate embodiment, if the requestor is determined to be a pre-programmed user or the task request is initiated based on sensor input(s) that are provided by the plurality of sensors 150 of the connected device(s) 146, the request determinant module 158 may access the preferred agent database 130 to analyze the one or more agent names populated by the (designated) requestor during the configuration phase of the application 104. In particular, the request determinant module 158 may analyze one or more records pertaining to the preferred agents that may apply to one or more matching names or phrases spoken by the requestor (e.g., while providing an assertion or confirming that a task request should be initiated). In one or more embodiments, if the request determinant module 158 determines the specific agent that the requestor has requested within the task request, the request determinant module 158 may access the task database 128 and may update the records pertaining to the task request with the agent requested for the task request.

The method 600 may proceed to block 606, wherein the method 600 may include analyzing the at least one statement to determine if the requestor has requested a task execution location and/or a task fulfillment location. In one embodiment, the request determinant module 158 may communicate with the command interpreter 126 to provide speech pattern recognition with respect to the one or more statements determined to be provided by the requestor. The speech pattern recognition may be utilized to determine if the requester requested (e.g., explicitly stated or implied) a specific location that is to be utilized as a task execution location and/or a specific location that is to be utilized as a task fulfillment location. In some configurations, the request determinant module 158 may also execute the task request logic to utilize one or more stored common names and/or common phrases that may pertain to one or more types of common location names and/or vendor types that may apply to one or more locations. The task request logic may provide a match to a name or a phrase (e.g., Airport, Grocery Store, Home) that may be applied to determine a requested task execution location and/or a requested task fulfillment location.

In an additional embodiment, the request determinant module 158 may access the task database 128 to analyze records associated with one or more active or fulfilled tasks that may contain task execution locations and task fulfillment locations that were previously utilized with respect to fulfilled and active tasks and that may apply to one or more matching names or phrases spoken by the requestor. As an illustrative example, if the requestor provides a task request which includes the statement "I need a ride from my house to go to the airport," the request determinant module 158 may determine the task execution location as "home" and may utilize the user's home address (e.g., stored in the user's profile) as a task execution location address. Additionally, the request determinant module 158 may determine the task fulfillment location as "airport" and may utilize the navigation system 118 of the vehicle 102 and/or the POI database 132 to determine the airport address as the task fulfillment location address. In an exemplary embodiment, if the request determinant module 158 determines the task execution location and/or the task fulfillment location as requested by the requestor within the task request, the request determinant module 158 may access the task database 128 and may update the records pertaining to the task request with the task execution location and/or the task fulfillment location requested within the task request.

The method 600 may proceed to block 608, wherein the method 600 may include analyzing the at least one statement to determine if the requestor has requested a priority to execute and/or fulfill the task request. In an exemplary embodiment, the request determinant module 158 may communicate with the command interpreter 126 to provide speech pattern recognition with respect to the one or more statements to be provided by the requestor. The speech pattern recognition may be utilized to determine if the requester implicitly (e.g., based on details) or explicitly requested a priority that is to be associated with the task request. In some configurations, the request determinant module 158 may also execute the task request logic to utilize one or more stored common phrases that may pertain to one or more implicit or explicit statements that may apply to a priority of a task request.

As an illustrative example, if the requestor requests "the package must be delivered ASAP," the request determinant module 158 may determine that the requestor is requesting a high priority to execute and fulfill the task request. Therefore, the task request may be prioritized as 'high priority' to be executed and fulfilled with expediency. In one embodiment, if the request determinant module 158 determines the priority to execute and/or fulfill the task request as requested by the requestor within the task request, the request determinant module 158 may access the task database 128 and may update the records pertaining to the task request with the priority requested within the task request.

The method 600 may proceed to block 610, wherein the method 600 may include analyzing the at least one statement to determine if the requestor has requested a timeframe in which to execute and/or fulfill the task request. In one embodiment, the request determinant module 158 may communicate with the command interpreter 126 to provide speech pattern recognition with respect to the one or more statements determined to be provided by the requestor. The speech pattern recognition may be utilized to determine if the requestor requested (e.g., explicitly or implicitly) a timeframe in which to execute the task request at the task execution location and/or to fulfill the task request at the task fulfillment location. In some configurations, the request determinant module 158 may also execute the task request logic to utilize one or more stored common names and/or common phrases that may pertain to one or more instances of time and/or timeframes. The task request logic may provide a match to a name or a phrase (e.g., sunrise, dinner time, tonight, evening, tomorrow) that may be applied to determine a timeframe(s) that may be associated with the execution of the task and/or the fulfillment of the task.

In an additional embodiment, the request determinant module 158 may access the task database 128 to analyze records associated with one or more active and/or fulfilled tasks that may contain timeframes to execute the task and/or timeframes to fulfill the task that were previously utilized within one or more active and/or fulfilled tasks and that may apply to one or more matching names or phrases spoken by the requestor. As an illustrative example, if the requestor provides a task request which includes the statement "I need a ride from home to go to the airport for my 9 AM flight tomorrow," the request determinant module 158 may determine the task execution timeframe as a pickup time during a following morning that may occur three hours ahead of the 9 AM flight time. Additionally the request determinant module 158 may determine the task fulfillment timeframe as a drop off time during the following morning that may occur two hours ahead of the 9 AM flight time. In an exemplary embodiment, if the request determinant module 158 determines the timeframe in which to execute the task request and/or facilitate the task request as requested by the requestor within the task request, the request determinant module 158 may access the task database 128 and may update the records pertaining to the task request with the requested task execution timeframe and/or requested task fulfillment timeframe.

The method 600 may proceed to block 612, wherein the method 600 may include analyzing the at least one statement to determine if the requestor has requested a preferred price range in which to execute and/or fulfill the task request. In one embodiment, the request determinant module 158 may communicate with the command interpreter 126 to provide speech pattern recognition with respect to the one or more statements determined to be provided by the requestor. The speech pattern recognition may be utilized to determine if the requester requested (e.g., explicitly or implicitly) a price range in which to execute and fulfill the task request. The price range may include one or more requested price points that the requestor may state within the spoken task request in which the requestor would like the task request to be executed and fulfilled. For example, the requestor may request "a ride to the airport for under twenty dollars." The request determinant module 158 may analyze the statement "for under twenty dollars" and may thereby determine the preferred price range in which to execute the task request as 'up to twenty dollars.'

In some configurations, the request determinant module 158 may also execute the task request logic to utilize one or more stored common names and/or common phrases that may pertain to one or more price points, price suggestions, price ranges, and/or budgets. The task request logic may provide a match to a name or a phrase (e.g., for about thirty bucks) that may be applied to determine a preferred price range that may be associated with the execution of the task and/or the fulfillment of the task.

In an additional embodiment, the request determinant module 158 may access the task database 128 to analyze records associated with one or more active and/or fulfilled tasks that may contain preferred price ranges to execute and/or fulfill the task that were previously utilized within active and/or fulfilled tasks and that may apply to one or more matching names or phrases spoken by the requestor. In an exemplary embodiment, if the request determinant module 158 determines the preferred price range in which to execute and fulfill the task request as provided by the requestor within the task request, the request determinant module 158 may access the task database 128 and may update the records pertaining to the task request with the preferred price range requested within the task request.

In one or more embodiments, upon determining the content, category, and one or more additional request attributes of the task request provided by the requestor, the request determinant module 158 may communicate respective data to the task location assignment module 160, the agent assignment module 162, and the task creation module 164. As discussed below, the modules 160, 162, 164 may evaluate the data pertaining to the content, category, and one or more request attributes of the task request to further process the task request.

With particular reference to the task location assignment module 160, the module 160 may process and assign the task execution location and the task fulfillment location based on the one or more request attributes (based on the statement(s) provided by the requestor) and/or by analysis of additional information in circumstances when the requestor may not request a particular task execution location and/or task fulfillment location within the spoken task request.

Figure 7A:
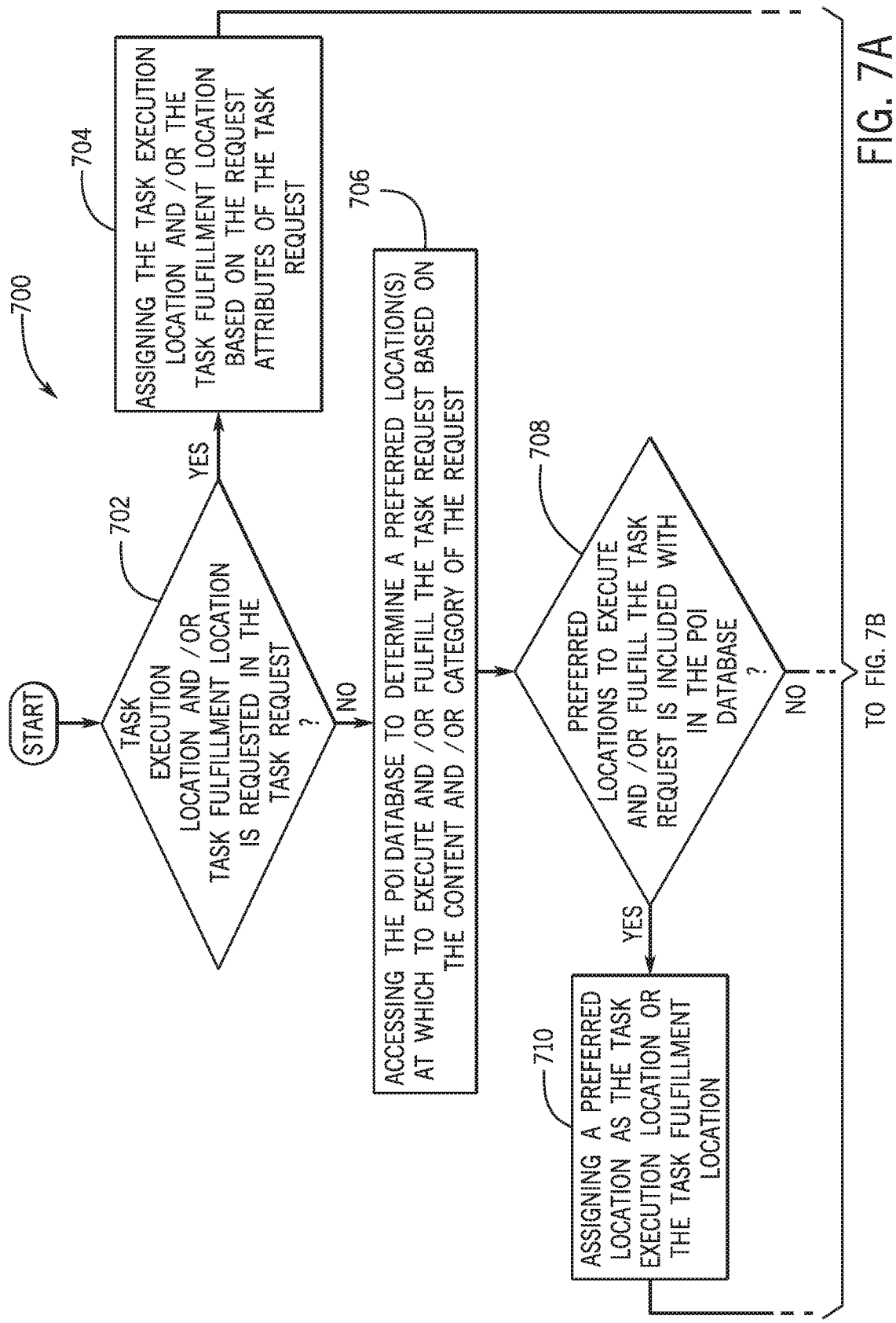
FIG. 7A is a first process flow diagram of a method for assigning a task execution location and a task fulfillment location by a task location assignment module of the task request application according to an exemplary embodiment.

FIG. 7A is a first process flow diagram of a method 700 for assigning a task execution location and the task fulfillment location by the task location assignment module 160 of the task request application 104 according to an exemplary embodiment. The method 700 will be described with reference to the components of FIG. 1, though it is to be appreciated that the method 700 may be used with other systems/components. For purposes of simplicity, the method 700 will be described with respect to processing that is applied at each block that pertains to the task execution location and/or the task fulfillment location. However, it is to be appreciated that each of the blocks may be separately and independently executed to determine the task execution location and the task fulfillment location separately and independently from one another as respectively required.

The method 700 may begin at block 702, wherein the method 700 may include determining if the task execution location and/or the task fulfillment location is requested in the task request provided by the requestor. In an exemplary embodiment, the task location assignment module 160 may analyze the data pertaining to the content, category, and one or more request attributes of the task request as communicated by the request determinant module 158 to determine if one or more of the task attributes associated with at least one statement of the requestor's task request pertain to the request of a particular task execution location and/or task fulfillment location.

As discussed above, with respect to block 606 of the method 600, the request determinant module 158 may determine if the requestor has requested the task execution location and/or the task fulfillment location based on the analysis of at least one statement. Accordingly, if the request determinant module 158 communicates data pertaining to the requested task execution location and/or task fulfillment location, the task location assignment module 160 may determine that the task location is requested in the task request provided by the requestor.

In an alternate embodiment, the task location assignment module 160 may communicate with the external server 108 to query the task database 128 to retrieve the records associated with the current task request. Upon retrieving the records associated with the current task request, the task location assignment module 160 may determine if the records associated with the task execution location field and/or the task fulfillment location field have been updated by the request determinant module 158. If the records associated with the task execution location field and/or the task fulfillment location field have been updated, the task location assignment module 160 may determine that the task execution location and/or the task fulfillment location is requested in the task request.

If it is determined that the task execution location and/or the task fulfillment location is requested in the task request provided by the requestor (at block 702), the method 700 may proceed to block 704, wherein the method 700 may include assigning the task execution location and/or the task fulfillment location based on the request attributes of the task request. In one or more embodiments, upon determining that the task execution location and/or the task fulfillment location is requested, the task location assignment module 160 may assign the task execution location and/or task fulfillment location as determined from the data pertaining to the content, category, and one or more request attributes of the task request as communicated by the request determinant module 158. In an alternate embodiment, the task location assignment module 160 may communicate with the external server 108 and may assign the task execution location and/or the task fulfillment location included within the records associated with the task execution location field and/or the task fulfillment location field of the current task request.

If it determined that the task execution location and/or the task fulfillment location is not requested in the task request (at block 702), the method 700 may proceed to block 706, wherein the method 700 may include accessing the POI database 132 to determine a preferred location(s) at which to execute and/or fulfill the task request based on the content and/or category of the request. As discussed above, with respect to block 602 of the method 600, the request determinant module 158 may determine the content and category of the task request as provided by the requestor within the spoken task request. Also, as discussed, in some embodiments, the request determinant module 158 may determine the content and category of the task request based on sensor input(s) provided by the plurality of sensors 150 of the connected device(s) 146.

Accordingly, when the request determinant module 158 communicates data pertaining to the task request, the task location assignment module 160 may determine the content and category of the task request. In an alternate embodiment, the task location assignment module 160 may communicate with the external server 108 to query the task database 128 to retrieve the records associated with the current task request. Upon retrieving the records associated with the current task request, the task location assignment module 160 may retrieve information from the records associated with the content and/or category fields of the task database 128.

Upon determining the content and category of the task request, the task location assignment module 160 may communicate with the external server 108 to query the POI database 132 to determine if the (designated) requestor may prefer one or more points of interest that may be utilized as the task execution location and/or the task fulfillment location. As discussed above, the POI database 132 may include records that indicate one or more points of interest that may be frequently used as task execution and/or task fulfillment locations that are preferred to the user(s). The one or more preferred points of interest may include one or more categories of locations, individual addresses, and/or vendors that may be utilized to facilitate one or more types of task requests. In one embodiment, the task location assignment module 160 may evaluate the one or more records to determine a preferred location(s) at which to execute and/or fulfill the task request.

The method 700 may proceed to block 708, wherein the method 700 may include determining if preferred locations to execute and/or fulfill the task request is included within the POI database 132. In an exemplary embodiment, upon evaluation of the one or more records of the POI database 132, the task location assignment module 160 may evaluate the points of interest within the records of the database 132 to determine if any of the points of interest within the database 132 may apply to the content and category of the current task request, as determined by the request determinant module 158. If it is determined that one or more points of interest may apply towards the content and category of the task request, the task location assignment module 160 may determine that the preferred location(s) to execute and/or fulfill the task request is included within the POI database 132.

If it is determined that the preferred locations to execute and/or fulfill the task request is included within the POI database 132 (at block 708), the method 700 may proceed to block 710, wherein the method 700 may include assigning a preferred location as the task execution location and/or the task fulfillment location. In one or more embodiments, upon determining that one or more of the points of interest within the database 132 may apply to the content and category of the task request, the task location assignment module 160 may further analyze the record(s) within the category priority field (field 412 of FIG. 4) of the POI database 132 to assign a particular point of interest as the task execution location and/or a particular point of interest as the task fulfillment location.

As an illustrative example, if the task request includes the statement "pick me up a pizza from my favorite pizza place," the task location assignment module 160 may evaluate the POI database 132 and may determine a pizza restaurant that has been inputted as a point of interest with a particular category priority to be assigned as the task execution location to execute the task request of "picking up a pizza." As another illustrative example, if the plurality of sensors 150 provide sensor inputs that pertain to picking up a carton of milk based on a determination that the requirement is to be fulfilled (based on a milk carton being almost empty in a smart refrigerator), the task location assignment module 160 may evaluate the POI database 132 and may determine a grocery store that has been inputted as a point of interest with a particular category priority to be assigned as the task execution location to execute the task request of "picking up a carton of milk."

Figure 7B:
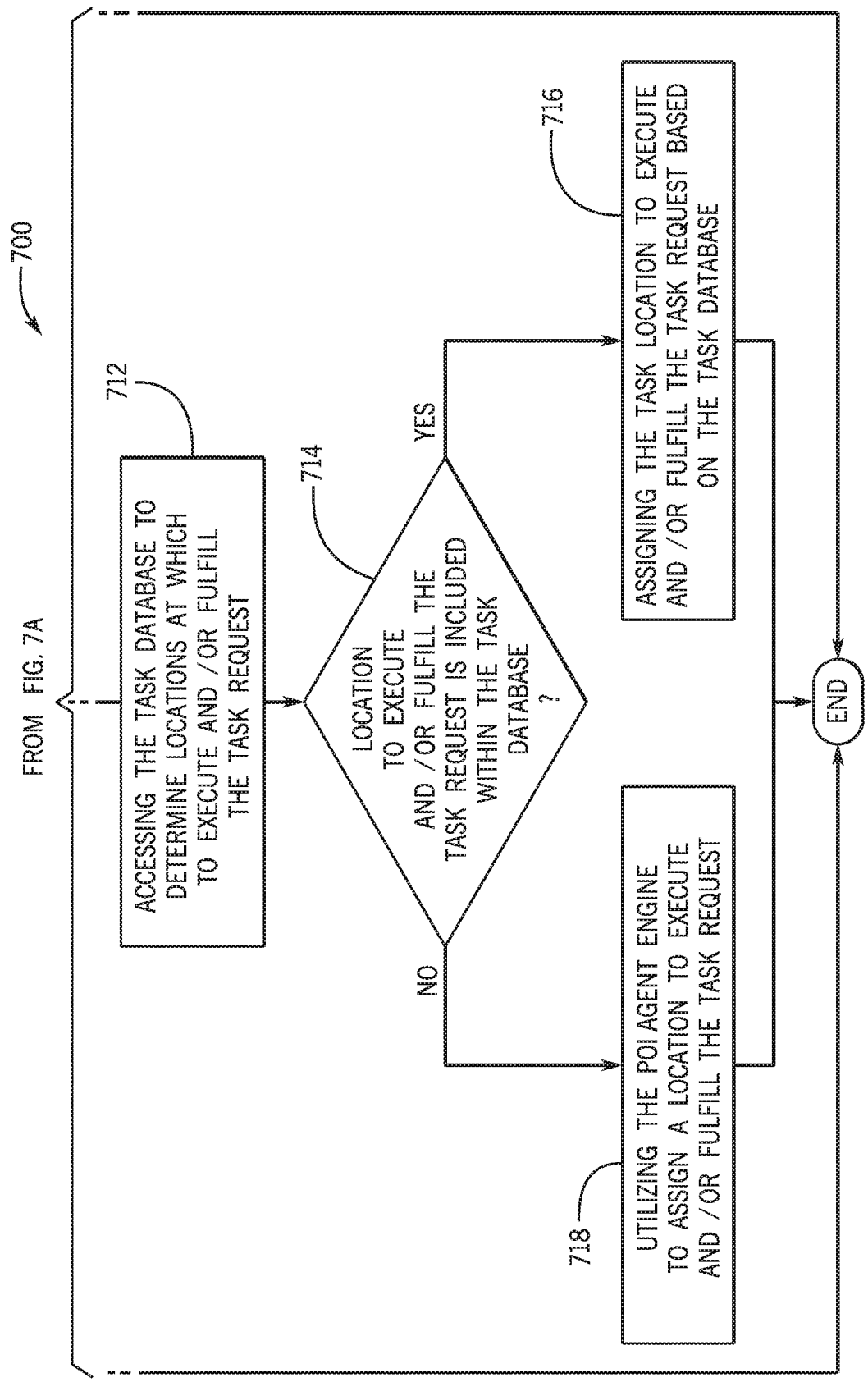
FIG. 7B is a second process flow diagram of the method for assigning the task execution location and the task fulfillment location by the task location assignment module of the task request application according to an exemplary embodiment.

FIG. 7B is a second process flow diagram of the method 700 for assigning the task execution location and the task fulfillment location by the task location assignment module 160 of the task request application 104 according to an exemplary embodiment. If it is determined that the preferred locations to execute and/or fulfill the task request is not included (at block 708 of FIG. 7A), the method 700 may proceed to block 712, wherein the method 700 may include accessing the task database 128 to determine locations at which to execute and/or fulfill the task request. In one embodiment, the task location assignment module 160 may access the task database 128 to retrieve one or more records associated with active tasks and/or fulfilled tasks that may include a similar content and category of the current task request to determine locations at which to execute and/or fulfill the task request.

The method 700 may proceed to block 714, wherein the method 700 may include determining if the location to execute and/or fulfill the task request is included within the task database 128. In one embodiment, if the task location assignment module 160 determines one or more records associated with active tasks and/or fulfilled tasks that may include a similar content and category of the current task request, the module 160 may further analyze the records. In particular, the task location assignment module 160 may analyze the one or more active or fulfilled tasks that may contain task execution locations and/or task fulfillment locations that were previously inputted and/or utilized for similar task requests that may include a similar content and category.

More specifically, the module 160 may analyze the one or more active or fulfilled tasks to determine if they may apply to the content and the category of the current task request. If it is determined that one or more of the task execution locations and/or the task fulfillment locations that were previously inputted and/or utilized may apply towards the content and category of the current task request, the task location assignment module 160 may determine that the location to execute and/or fulfill is included within the task database 128.

If it is determined that the location to execute and/or fulfill the task request is included within the task database 128, the method 700 may proceed to block 716, wherein the method 700 may include assigning the task location to execute and/or fulfill the task request based on the task database 128. In an exemplary embodiment, upon determining that one or more of the task execution locations and/or the task fulfillment locations that were previously inputted and/or utilized may apply towards the content and category of the current task request, the task location assignment module 160 may compare additional task attributes provided by the request determinant module 158 to task attributes included within the records associated with the active tasks and/or fulfilled tasks that may include a similar content and category of the current task request.

More specifically, the module 160 may determine a task execution location and task fulfillment location that is included within records with the most (e.g., a highest amount) matching/similar request attributes with the current task request. The task location assignment module 160 may thereby assign the task execution location and/or task fulfillment location as one of the task execution locations and/or the task fulfillment locations that were previously inputted and/or utilized for active tasks and/or fulfilled tasks with the most matching/similar request attributes with the current task request.

If it is determined that the location to execute and/or fulfill the task request is not included within the task database (at block 714), the method 700 may proceed to block 718, wherein the method 700 may include utilizing the POI/Agent engine 134 and/or a real-time location information to assign a location to execute and/or fulfill the task request. As discussed above, the POI agent engine 134 may be configured to provide one or more third-party vendors that may be used as a task execution location and/or a task fulfillment location by the application 104 when one or both of the locations are not provided by the requestor requesting the task request. In particular, the POI agent engine 134 may provide one or more third-party vendors such as one or more commercial service providers and/or one or more locations (e.g., addresses) that may be assigned as the location at which the task request may be executed and/or fulfilled.

In one embodiment, the task location assignment module 160 may communicate with the external server 108 to provide one or more request attributes (as determined and communicated by the request determinant module 158) to the POI agent engine 134. The POI agent engine 134 may evaluate the one or more request attributes that may include the priority to compete the task request and/or a requested timeframe in which to execute and/or fulfill the task request, etc. Upon evaluation of the one or more request attributes, the POI agent engine 134 may provide one or more locations (e.g., addresses of third-party vendors) that may be assigned as the location to execute and/or fulfill the task request.

The task location assignment module 160 may evaluate the one or more locations provided by the POI agent engine 134 and may assign the location to execute and/or fulfill the task request based on the location(s) that satisfy the request attributes of the one or more request attributes included with the task request. For example, the POI agent engine 134 may provide a task execution location that satisfies the request attributes with respect to the timeframe to execute the task request as provided by the requestor that may be assigned as the task execution location by the task location assignment module 160.

In an additional embodiment, the task location assignment module 160 may also communicate with the external server 108 to provide one or more request attributes pertaining to the price range to execute and/or fulfill the task request to assign the task execution location and/or the task fulfillment location. As discussed above, the pricing engine 136 may be configured to provide one or more pricing schemes/price points that may be applicable to one or more third-party vendors (included within the preferred agent database 130 or provided by the POI agent engine 134) that may be assigned as a task execution location, and/or a task fulfillment location.

In one configuration, the pricing engine 136 may evaluate one or more request attributes pertaining to the price range requested by the requestor. Upon evaluation of the one or more request attributes, the pricing engine 136 may provide one or more locations (e.g., addresses of third-party vendors) that may be assigned as the location to execute and/or fulfill the task request based on one or more pricing schemes/price points that may be applicable to one or more third-party vendors.

The task location assignment module 160 may evaluate the one or more locations provided by the pricing engine 136 and may assign the location(s) to execute and/or fulfill the task request based on the location(s) that satisfy one or more of the request attributes pertaining to the price range included with the task request. For example, the pricing engine 136 may provide a task execution location that satisfies the request attributes with respect to the price range (e.g., where a product may be found within a requested price range) to execute the task request as provided by the requestor. The task execution location provided by the pricing engine 136 may be thereby assigned as the task execution location by the task location assignment module 160.

In some embodiments, the task location assignment module 160 may also communicate with the navigation system 118 of the vehicle 102 and/or the location sensors 142a of the portable device 106a to determine the real-time location of the requestor. In particular, the real-time location may be utilized as the task execution location (e.g., a pick-up location for travel to a destination) or as the task fulfillment location (a drop-off point for a grocery delivery). The task location assignment module 160 may evaluate the one or more request attributes as communicated by the request determinant module 158 and may thereby communicate with the navigation system 118 and/or the location sensors 142 to determine the real-time location (e.g., GPS coordinates, DGPS coordinates, a physical address) of the requestor to be assigned as the task execution location and/or the task fulfillment location.

In an alternate embodiment, when the task request is received through the voice recognition system of the connected device(s) 146 and/or is initiated based on sensor input(s) provided by the plurality of sensors 150 of the connected device(s) 146 determining that a requirement is to be fulfilled, the task location assignment module 160 may determine the physical location of the connected device(s) 146 based on a physical address and/or internet protocol address associated with the connected device(s) 146. In particular, the physical location of the connected device(s) 146 may be utilized as the task execution location (e.g., a pick-up location for travel to a destination) or as the task fulfillment location (a drop-off point for a grocery delivery).

In an exemplary embodiment, upon assigning the task execution location and/or the task fulfillment location, the task location assignment module 160 may communicate with the external server 108 to access the task database 128. Upon accessing the task database 128, the task location assignment module 160 may update the records pertaining to the task request with the assigned task execution location and/or the assigned task fulfillment location. The task location assignment module 160 may additionally communicate respective data pertaining to the assigned task execution location and/or assigned task fulfillment location to the agent assignment module 162 and the task creation module 164.

As discussed below, the modules 162, 164 may utilize the assigned task execution location and/or the assigned task fulfillment location to further process the task request provided by the requestor. With particular reference to the agent assignment module 162, the module 162 may process and assign the agent based on the one or more request attributes (based on the statement(s) provided by the requestor), the assigned task execution location, the assigned task fulfillment location, and/or by analysis of additional information.

Figure 8A:
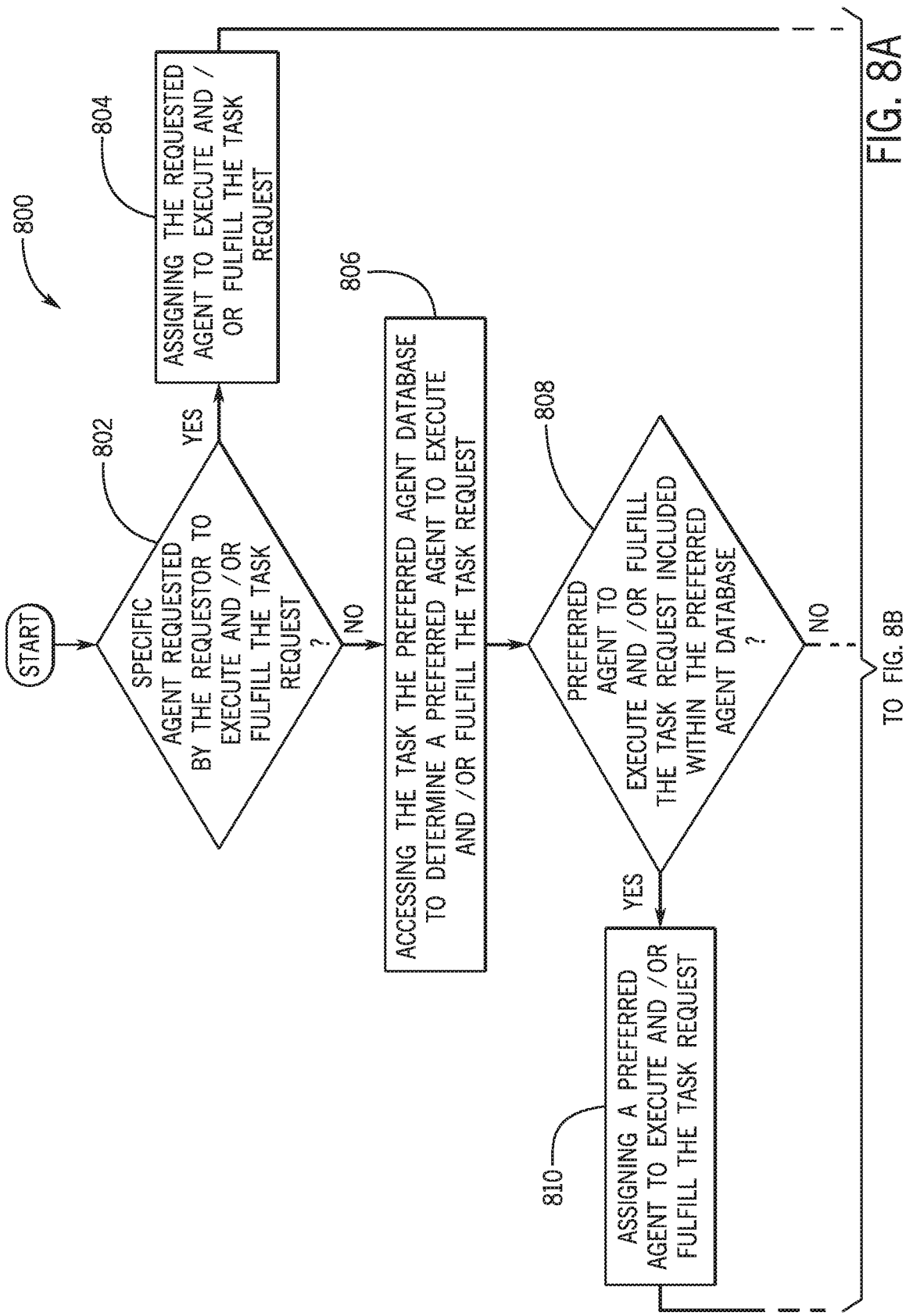
FIG. 8A is a first process flow diagram of a method for assigning an agent to execute and/or fulfill the task request by an agent assignment module of the task request application according to an exemplary embodiment.

FIG. 8A is a first process flow diagram of a method 800 for assigning an agent to execute and/or fulfill the task request by the agent assignment module 162 of the task request application 104 according to an exemplary embodiment. The method 800 will be described with reference to the components of FIG. 1, though it is to be appreciated that the method 800 may be used with other systems/components. For purposes of simplicity, the method 800 will be described with respect to assigning an agent to execute and/or fulfill the task request requested by the requestor. However, it is to be appreciated that each of the blocks may be separately and independently executed to assign a first agent to execute the task request and to assign a second agent to fulfill the task request separately from one another as respectively required.

The method 800 may begin at block 802, wherein the method 800 may include determining if a specific agent is requested by the requestor to execute and/or fulfill the task request. In an exemplary embodiment, the agent assignment module 162 may analyze the data pertaining to the content, category, and one or more request attributes of the task request as communicated by the request determinant module 158 to the agent assignment module 162.

The agent assignment module 162 may analyze the data to determine if one or more of the task attributes associated with at least one statement of the requestor's task request pertain to a specific agent to execute and fulfill the task request. As discussed above, with respect to block 604 of the method 600, the request determinant module 158 may determine if the requestor has requested a specific agent based on the analysis of at least one statement. Accordingly, if the request determinant module 158 communicates data pertaining to the specific agent requested, the task location assignment module 160 may determine the specific agent that is requested in the task request provided by the requestor.

In an alternate embodiment, the agent assignment module 162 may communicate with the external server 108 to query the task database 128 to retrieve the records associated with the current task request. Upon retrieving the records associated with the current task request, the agent assignment module 162 may determine if the records associated with the specified agent has been updated by the request determinant module 158. If the record associated with the specified agent field has been updated, the agent assignment module 162 may determine that the specified agent is requested in the task request.

If it is determined that a specific agent is requested by the requestor to execute and/or fulfill the task request (at block 802), the method 800 may proceed to block 804, wherein the method 800 may include assigning the requested agent to execute and/or fulfill the task request. In one or more embodiments, upon determining that a specific agent is requested, the agent assignment module 162 may assign the specific requested agent as the agent to execute and/or fulfill the task request as determined from the data pertaining to the content, category, and one or more request attributes of the task request as communicated by the request determinant module 158. In an alternate embodiment, the agent assignment module 162 may communicate with the external server 108 and may assign the particular agent included within the records associated with the specified agent field of the current task request.

If it is determined that the specific agent is not requested by the requestor to execute and/or fulfill the task request (at block 802), the method 800 may proceed to block 806, wherein the method 800 may include accessing the preferred agent database 130 to determine a preferred agent to execute and/or fulfill the task request. As discussed above, with respect to block 602 of the method 600, the request determinant module 158 may determine the content and category of the task request provided by the requestor. Also, as discussed, in some embodiments, the request determinant module 158 may determine the content and category of the task request based on sensor input(s) provided by the plurality of sensors 150 of the connected device(s) 146.

Accordingly, when the request determinant module 158 communicates data pertaining to the task request, the agent assignment module 162 may determine the content and category of the task request. In an alternate embodiment, the agent assignment module 162 may communicate with the external server 108 to query the task database 128 to retrieve the records associated with the current task request. Upon retrieving the records associated with the current task request, the agent assignment module 162 may retrieve information from the records associated with the content and/or category fields of the task database 128.

Upon determining the content and category of the task request, the agent assignment module 162 may communicate with the external server 108 to query the preferred agent database 130 to determine if the requestor prefers one or more agents that may be utilized to execute and/or fulfill the particular categories of tasks that include a similar content and/or category as the currently requested task. As discussed, the preferred agent database 130 may be populated with a list of preferred agents (e.g., individual agents, family members, friends, groups, businesses) that the requestor would like to designate as preferred agents to execute and/or fulfill a particular type of task request based on the content of the task request and/or the category of the task request. In one embodiment, the agent assignment module 162 may evaluate the one or more records to determine a preferred agent to execute and/or fulfill the type of task request based on the content and/or the category of the current task request.

The method 800 may proceed to block 808, wherein the method 800 may include determining if a preferred agent to execute and/or fulfill the task request is included within the preferred agent database 130. In an exemplary embodiment, upon evaluation of the one or more records of the preferred agent database 130, the agent assignment module 162 may evaluate the preferred agents (e.g., included within the preferred agent field) within the records of the database 132 to determine if any of the preferred agents within the database 130 may apply towards the content of the current task request and/or the category of the current task request, as determined by the request determinant module 158. If it is determined that one or more preferred agents apply with respect to the content and/or the category of the task request, the agent assignment module 162 may determine that the preferred agent(s) to execute and/or fulfill the task request is included within the preferred agent database 130.

If it is determined that the preferred agent to execute and/or fulfill the task request is included within the preferred agent database (at block 808), the method 800 may proceed to block 810, wherein the method 800 may include assigning a preferred agent to execute and/or fulfill the task request. In one or more embodiments, upon determining that one or more of the preferred agents within the database 130 may apply to the content and category of the task request, the agent assignment module 162 may further analyze the record(s) within the task category field of the preferred agent database 130 to assign a particular preferred agent as the agent to execute the task request and/or a particular preferred agent as the agent to fulfill the task request.

FIG. 8B is a second process flow diagram of the method 800 for assigning the agent to execute and/or fulfill the task request by the agent assignment module 162 of the task request application according to an exemplary embodiment. If it is determined that the preferred agent to execute and/or fulfill the task request is not included within the preferred agent database (at block 808 of the FIG. 8A), the method 800 may proceed to block 812, wherein the method 800 may include accessing the task database 128 to determine one or more agents used to execute and/or fulfill the task request based on the prior tasks. In one embodiment, the agent assignment module 162 may access the task database 128 to retrieve one or more records associated with active tasks and/or fulfilled tasks that may include a similar content and category of the current task request to determine one or more agents that may be utilized to execute and/or fulfill the task request.

The method 800 may proceed to block 814, wherein the method 800 may include determining if an agent to execute and/or fulfill the task request is included within the task database. In one embodiment, if the agent assignment module 162 determines one or more records associated with active or fulfilled tasks that may include a similar content and/or task category of the current task request, the module 162 may further analyze the records. In particular, the agent assignment module 162 may analyze the one or more active or fulfilled tasks that may contain previously specified agents and previously assigned agents that were previously inputted and/or utilized for similar task requests that may include a similar content and task category to determine if they may apply to the content and the category of the current task request. If it is determined that one or more of the specified agents and/or assigned agents that were previously inputted and/or utilized may apply towards the content and category of the current task request, the agent assignment module 162 may determine that the agent to execute and/or fulfill is included within the task database 128.

If it is determined that the agent to execute and/or fulfill the task request is included within the task database (at block 814), the method 800 may proceed to block 816, wherein the method 800 may include assigning the agent to execute and/or fulfill the task request based on the task database 128. In an exemplary embodiment, upon determining that one or more of the specified agents and/or assigned agents that were previously inputted and/or utilized may apply towards the content and category of the current task request, the task location assignment module 160 may compare the assigned task execution location and/or the task fulfillment location (as assigned by the task location assignment module 160) against the respective records associated with the active tasks and/or fulfilled tasks that may include a similar content and category of the current task request. This analysis may be completed to determine one or more agents that may be utilized to execute the task at or within a predetermined distance of a task execution location and/or at or within a predetermined distance of the fulfillment location.

In particular, the agent assignment module 162 may determine which of the specified agents and/or assigned agents that are included within records of similar content and/or categories of the current task request have been specified to and/or assigned to execute and/or fulfill task request(s) at or within a predetermined distance of the assigned task execution location and/or assigned task fulfillment location of the current task request. The agent assignment module 162 may thereby assign the agent as one that has been previously specified to and/or assigned to execute and/or fulfill the task request at an exact location or within a closest distance of the assigned task execution location and/or the assigned task fulfillment location of the current task request (as assigned by the task location assignment module 160 per the execution of the method 700).

If it is determined that the agent to execute and/or fulfill the task request is not included within the task database (at block 814), the method 800 may proceed to block 818, wherein the method 800 may include utilizing the POI agent engine 134 to assign an agent to execute and/or fulfill the task request. In one or more embodiments, the agent assignment module 162 may communicate with the location sensors 142*b* of the portable device 106*b* used by a respective agent(s) to determine the real-time location of the agent(s). In particular, the real-time location may be utilized to determine if the agent(s) is located within a predetermined distance of the assigned task execution location or the assigned task fulfillment location.

As discussed above, the POI agent engine 134 may be configured to provide one or more third-party vendors that may be used as an agent by the application 104 when one or more preferred agents are not provided by the requestor requesting the task request. In particular, the POI agent engine 134 may provide one or more third-party vendors such as one or more commercial service providers that may be assigned as the agent to execute and/or fulfill the task request.

In one embodiment, the agent assignment module 162 may communicate with the external server 108 to provide one or more request attributes to the POI agent engine 134 in addition to the assigned task execution location and the assigned task fulfillment location. The POI agent engine 134 may evaluate the assigned task execution location and the assigned task fulfillment location in addition to the one or more request attributes including the priority to compete the task request and/or a requested timeframe in which to execute and/or fulfill the task request, etc.

Upon evaluation of the one or more request attributes, the POI agent engine 134 may provide one or more agents (e.g., third-party vendors/service providers) that may be located (e.g., real time location, business address location) within a predetermined distance of the assigned task execution location and/or the assigned task fulfillment location that may allow the task to be executed and/or fulfilled within the requested timeframe to accommodate the priority of the task request and the requested timeframe in which to execute and/or fulfill the task request as requested by the requestor.

The agent assignment module 162 may evaluate the one or more agents provided by the POI agent engine 134 and may assign the agent(s) to execute and/or fulfill the task request based on the agent(s) that that may be located within a closest distance of the assigned task execution location and/or the assigned task fulfillment location. This evaluation may be completed to assign agent(s) that may allow the task request to be executed and/or fulfilled within the requested timeframe to accommodate the priority of the task request as requested by the requestor.

In an additional embodiment, the agent assignment module 162 may communicate with the external server 108 to provide one or more request attributes pertaining to the price range to execute and/or fulfill the task request to assign the agent to execute and/or fulfill the task request. In one configuration, the pricing engine 136 may be accessed to provide one or more pricing schemes/price points that may be applicable to one or more third-party vendors (included within the preferred agent database 130 or provided by the POI agent engine 134) that may be located within a predetermined distance of the assigned task execution location and/or the assigned task fulfillment location. The pricing engine 136 may provide one or more third-party vendors that may be located within the predetermined distance of the assigned task execution location and/or the assigned task fulfillment location and may execute and/or fulfill the task request within the price range requested by the requestor. The agent assignment module 162 may thereby assign the agent to execute and/or fulfill the task request based on data provided by the pricing engine 136.

In an alternate embodiment, when the task request is received through the voice recognition system of the connected device(s) 146 and/or is initiated based on sensor input(s) provided by the plurality of sensors 150 of the connected device(s) 146 determining that a requirement is to be fulfilled, the agent assignment module 162 may determine the physical location of the connected device(s) 146 based on a physical address and/or Internet protocol address associated with the connected device(s) 146. In particular, the physical location of the connected device(s) 146 may be utilized to assign a particular specific/preferred agent to execute and/or fulfill the task request based on the particular specific/preferred agent being located within a predetermined distance (e.g., 5 miles) of the connected device(s) 146, the assigned task execution location, and/or the assigned task fulfillment location, as determined based on data provided by the location sensors 142*b* of the portable device 106*b*.

In an exemplary embodiment, upon assigning the agent to execute and/or fulfill the task request, the agent assignment module 162 may communicate with the external server 108 to access the task database 128. Upon accessing the task database 128, the agent assignment module 162 may update the records pertaining to the task request with the assigned agent. The agent assignment module 162 may additionally communicate respective data pertaining to the assigned agent to the task creation module 164. As discussed below, the task creation module 164 may process and create the task request based on the one or more request attributes (based on the statement(s) provided by the requestor and/or the sensor input(s) provided by the plurality of sensors 150 of the connected device(s) 146), the task execution location, the task fulfillment location, the assigned agent and/or by analysis of additional information.

Figure 9:
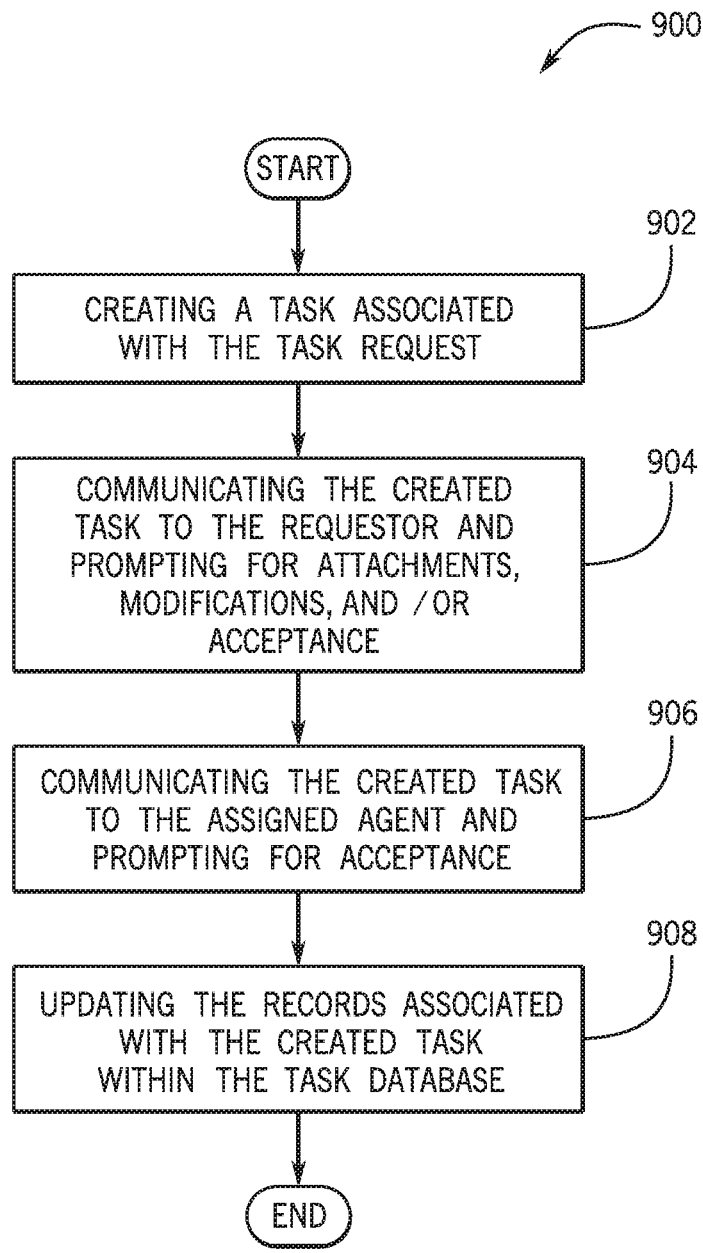
FIG. 9 is a process flow diagram of a method for creating and communicating a task associated with the task request requested by the requestor by a task creation module of the task request application according to an exemplary embodiment.

FIG. 9 is a process flow diagram of a method 900 for creating and communicating a task associated with the task request requested by the requestor by the task creation module 164 of the task request application 104 according to an exemplary embodiment. FIG. 9 will be described with reference to the components of FIG. 1, though it is to be appreciated that the method 900 of FIG. 9 may be used with other systems/components. The method 900 may begin at block 902, wherein the method 900 may include creating a task associated with the task request. In an exemplary embodiment, the task creation module 164 may create a task (e.g., data file) that may be populated with the requestor's information, the content and category of the task request, the assigned task execution location, the assigned task fulfillment location, the assigned agent, the priority of the task request, and one or more additional request attributes determined and communicated by the request determinant module 158 pertaining to the task request.

In one or more embodiments, the task creation module 164 may communicate with the external server 108 to access the task database 128 and may analyze records associated with one or more active tasks to determine an urgency that is to be associated with the created task. In particular, the one or more records may be analyzed with respect to the priority of the active tasks, a determined urgency of the active tasks, task execution locations of the active tasks, task fulfillment locations of the actives tasks, and assigned agents of the active tasks to determine if an urgency to execute and/or fulfill the currently created task may be influenced by the urgency of the active tasks, the locations of execution or fulfillment and/or by common assigned agents of the active tasks. In one configuration, the task creation module 164 may determine an urgency based independently on the request attributes (priority, timeframes to execute and/or fulfill) of the currently created task to ensure that the task is marked with an urgency that is based on the requestor's wishes. Upon determining an urgency, the task creation module 164 may additionally populate records associated with the created task with the urgency assigned to the task.

In some configurations, the task creation module 164 may communicate with the external server 108 to determine one or more price points to execute and/or fulfill the task request by the assigned agent based on one or more of the request attributes provided within the task request. The pricing engine 136 may provide one or more pricing schemes/price points that may be applicable to one or more third-party vendors that may include the assigned agent. The pricing engine 136 may thereby provide one or more price points to the task creation module 164 that may pertain to the execution and fulfillment of the task request, prices that may be applicable to the task execution location, and/or that may be applicable to the task fulfillment location. Upon receipt of the one or more price points, the task creation module 164 may additionally populate the created task with the one or more price points that may be further provided to the requestor.

The method 900 may proceed to block 904, wherein the method 900 may include communicating the created task to the requestor and prompting for attachments, modifications, and/or acceptance. In one embodiment, the task creation module 164 may communicate with the head unit 112 of the vehicle 102, the processor 148 of the connected device(s) 146 and/or the processor 138*a* of the portable device 106*a* to present a task user interface (not shown) via the display unit 114 of the vehicle 102, through the connected device(s) 146 and/or through the portable device 106*a*. In particular, the task user interface may provide a HMI that includes text boxes that are populated with the content, category, request attributes, and associated assignments (e.g., assigned agent information, assigned task execution location, assigned task fulfillment location and additional request attributes) of the task created by the task creation module 164 (at block 902).

In one embodiment, the task user interface may be presented with an attachments prompt that allows the requestor to add one or more attachments that may be retrieved by the assigned agent upon receipt of the task. The one or more attachments may include one or more document files, picture files, video files, audio files, third-party application links, third-party website links, and the like that may include additional instructions/guidance that the requestor may like to provide to the assigned agent. For example, the requestor may utilize the attachments prompt to attach a grocery list for a task to pick up groceries that may be followed by the assigned agent.

In some configurations, the task user interface may also be presented with the item list user interface discussed above (presented as included as part of the task user interface). The item list user interface may include the item list with one or more items that are presented on the task user interface to allow the assigned agent to determine one or more items to be acquired. As discussed above, the item list user interface may be used by a user of the application 104 to populate the item list. In particular, the application 104 may include the item list within the task to be followed by the assigned agent to acquire any items within the list are remaining to be acquired.

In one or more embodiments, the task user interface may also be presented with a modifications prompt that allows the requestor to modify one or more aspects of the task. Upon inputting the modifications prompt, the task user interface may make each of the text boxes modifiable such that the requestor may change one or more of the aspects of the task created by the task creation module 164. For example, if the requestor would like to assign a different agent than the agent assigned by the agent assignment module 162, the requestor may modify the agent and manually assign an agent of choice which may include a newly added agent or a preferred agent. The requestor may add the manually assigned agent and in some cases may be prompted to provide additional information (e.g., location of agent) that may be provided to the POI agent engine 134 to determine agent information (e.g., agent address, hours of operation, etc.). If the requestor provides modifications to one or more text boxes of the task user interface, the task creation module 164 may re-create the task to include the modifications.

In one embodiment, the task user interface may also be presented with an acceptance prompt that allows the requestor to accept the created task (with or without modifications provided by the requestor). The input of the acceptance prompt may signify that the requestor is ready and willing to have the task be communicated to the assigned agent for execution and/or fulfillment. Upon inputting the acceptance prompt, the task user interface may present the requestor with a user interface message that pertains to the communication of the task to the agent as assigned by the agent assignment module 162 or as modified and manually assigned by the requestor on the task user interface.

In some embodiments, the task request application 104 may allow the requestor to provide vocal feedback regarding the created task through the vehicle 102, the connected device(s) 146, and/or the portable device 106*a*. In particular, vocal statements regarding the content, category, request attributes, and associated assignments (e.g., assigned agent information, assigned task execution location, assigned task fulfillment location and additional request attributes) of the task created by the task creation module 164 may be provided to the requestor through the vehicle 102, the connected device(s) 146, and/or the portable device 106 in a conversational style of speaking. The task creation module 164 may be configured to receive and interpret statements/responses based on one or more voice inputs that pertain to the user's acceptance of the one or more aspects of the task created by the task creation module 164 and/or statements that may pertain to changes to one or more of the aspects of the task created by the task creation module 164.

In one example, the task creation module 164 may communicate with the processor 148 of the connected device(s) 146 to operably control the speaker(s) of the connected device(s) 146 to conversationally discuss the one or more of the aspects of the task created by the task creation module 164. The task creation module 164 may also communicate with the processor 148 to receive voice input(s) pertaining to statements that may pertain to the user's acceptance of the one or more aspects of the created task such as the assigned agent and/or the assigned task execution location and/or statements that may pertain to changes to the one or more aspects of the created task, such as changes to the assigned agent and/or the assigned task execution location as spoken by the user.

The method 900 may proceed to block 906, wherein the method 900 may include communicating the created task to the assigned agent and prompting for acceptance. In an exemplary embodiment, upon receiving acceptance from the requestor with respect to the communication of the task, the task creation module 164 may communicate with the processor 138b of the portable device 106b (or a stand-alone computing device) used by the agent to present the task user interface to the agent through the portable device 106b (or the stand-alone computing device) used by the agent. In one embodiment, the module 164 may provide a HMI that includes text boxes that are populated with the content, category, request attributes, and associated assignments (e.g., requestor information, assigned task execution location, assigned task fulfillment location and additional request attributes) of the task created by the task creation module 164.

The task user interface may include an acceptance prompt that allows the agent to accept the communicated task. The input of the acceptance prompt may signify that the agent is ready and willing to execute and/or fulfill the task. Upon inputting the acceptance prompt, the task user interface may present the agent with a user interface message that pertains to the acceptance of the task to the agent. Additionally, the task user interface may be presented to the requestor (as discussed above) with a user interface message that the agent has accepted the task and may include a data and timestamp with respect to the acceptance of the task.

In some embodiments, the task user interface may also include a rejection prompt that may allow the assigned agent to reject the task (e.g., in cases the assigned agent may not be able to execute and/or fulfill the task per the task request). In some configurations, the task creation module 164 may determine that the task has been rejected by the agent if the module 164 determines that an input has not been received with respect to the acceptance of the task by the agent within a predetermined period of time (e.g., based on the priority, timeframe(s), and/or urgency of the task), or that the rejection prompt has been inputted by the agent. In such cases, the task creation module 164 may present the task user interface or may control verbal communications (e.g., through the connected device(s) 146) to the requestor (as discussed above) with one or more suggestions of alternative agents to assign as determined based on further analysis of the preferred agent database 130 and/or data provided by the POI agent engine 134 (in the manners described above). The requestor may thereby manually assign an agent of choice or may select from the one or more suggested agents to execute and/or fulfill the task.

The method 900 may proceed to block 908, wherein the method 900 may include updating the records associated with the created task within the task database 128. In an exemplary embodiment, upon acceptance of the task by the agent, the task creation module 164 may communicate with the external server 108 to access the task database 128. The task creation module 164 may update the records associated with the task request with data pertaining to the accepted created task and may update the status of the task request to an active task.

In one embodiment, upon the execution and fulfillment of the active task by the agent, the agent may utilize the task user interface to mark the active task as fulfilled. Upon the marking of the active task as fulfilled, the task creation module 164 may again access the task database 128 and may update the records associated with the active task executed and fulfilled by the agent. In particular, the task creation module 164 may update the status field of the task database 128 to change the status of the task from the active task to a fulfilled task.

Figure 10:
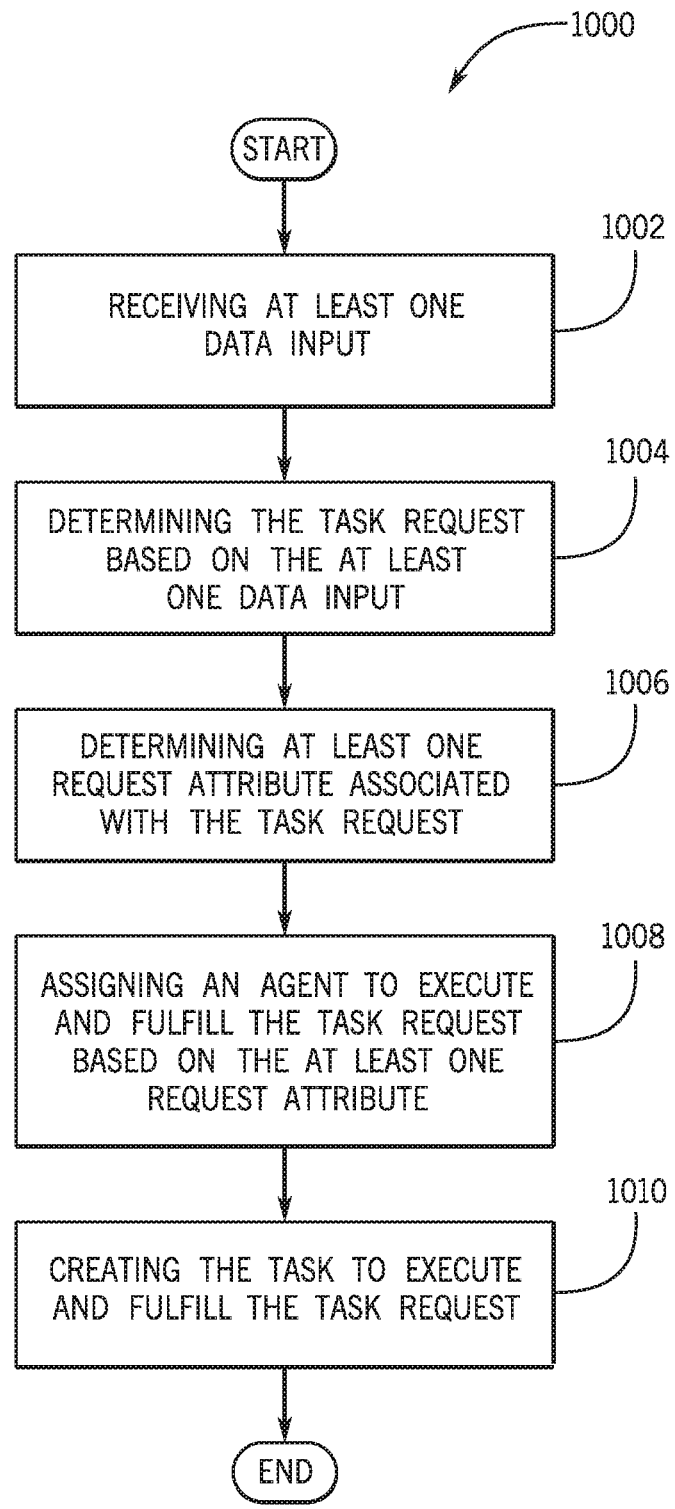
FIG. 10 is a process flow diagram of a method for processing a task request to be executed and fulfilled according to an exemplary embodiment.

FIG. 10 is a process flow diagram of a method 1000 for processing a task request to be executed and fulfilled according to an exemplary embodiment. FIG. 10 will be described with reference to the components of FIG. 1, though it is to be appreciated that the method 1000 of FIG. 10 may be used with other systems/components. The method 1000 may begin at block 1002, wherein the method 1000 may include receiving at least one data input. In one embodiment, the data input includes at least one of a: voice input and a sensor input. The method 1000 may proceed to block 1004, wherein the method 1000 may include determining the task request based on the at least one data input.

The method 1000 may proceed to block 1006, wherein the method 1000 may include determining at least one request attribute associated with the task request. In one embodiment, the at least one request attribute is determined based on analyzing the at least one data input. In one or more configurations, determining the at least one request attribute associated with the task request includes determining whether a category of the task request is at least one of a specific category that includes picking something or someone up for the home of the requester.

The method 1000 may proceed to block 1008, wherein the method 1000 may include assigning an agent to execute and fulfill the task request based on the at least one request attribute. In one configuration, assigning the agent to execute and fulfill the task request may also include assigning someone who lives with the requester if the category of the task is determined as one or more of the specific categories may include picking something or someone up for the home of the requester. The application 104 may thereby assign the task execution location and/or the task fulfillment location as the home of the requestor.

As an illustrative example, if a request attribute that is associated with the task request includes picking up a particular item or a particular person (e.g., son) for the home of the requestor, an agent that is related to the requestor (wife) such as a husband of the requestor may be assigned the task request to fulfill the task request at the home of the requestor which is assigned as the task execution location. Similarly, if a request attribute that is associated with the task request includes picking up groceries to be dropped to the requestor's home, an agent that is related to the requestor such as the husband of the requestor may be assigned the task request to fulfill the task request of picking up groceries to be dropped off at the home which is assigned as the task fulfillment location.

The method 1000 may proceed to block 1010, wherein the method 1000 may include creating the task to execute and fulfill the task request. In one embodiment, the task is sent to the agent to execute and fulfill the task request.

It should be apparent from the foregoing description that various exemplary embodiments of the invention may be implemented in hardware.

Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for processing a task request to be executed and fulfilled, comprising: electronically receiving at least one electronic data input, wherein the at least one electronic data input is electronically processed based on at least one of: at least one voice input that pertains to the task request that is spoken and is electronically received by an electronic microphone of at least one connected device and at least one sensor input that is electronically received from at least one of: a weight sensor, a camera sensor, and a LiDAR sensor of the at least one connected device;

electronically analyzing the electronic data input to electronically determine the task request based on at least one of: electronic multimodal processing of the at least one voice input to electronically determine at least one phrase that is electronically received by the connected device and is electronically parsed into at least one request attribute associated with the task request and execution of at least one of: weight logic, image logic, and LiDAR logic that is stored in an associated memory to electronically interpret a requirement to be fulfilled based on the at least one sensor input to electronically determine the at least one request attribute associated with the task request, wherein the at least one request attribute expressly includes a work to be executed and fulfilled, a classification of the task request, a specific timeframe in which to execute the task request, and a specific timeframe in which to fulfill the task request; and electronically presenting a task user interface that includes the at least one request attribute associated with the task request through a computing device used by a requestor to be electronically accepted through the task user interface, wherein the at least one connected device vocally confirms with the requestor to confirm if the requestor would like to make the task request, wherein upon electronic acceptance of the task request by the requestor a computing device used by an agent is electronically controlled to present the task user interface that includes the at least one request attribute associated with the task request to the agent to be electronically accepted for the agent to execute and fulfill the task request, wherein upon electronic acceptance of the task request by the agent, a task is electronically processed and assigned to the agent to execute and fulfill the task request based on the at least one request attribute, wherein upon electronic acceptance of the task request by the agent, at least one record of a task database is updated with electronic data pertaining to the accepted task, wherein the task is electronically communicated to the agent to execute and fulfill the task request through the computing device used by the agent to electronically present the task to the agent through the task user interface.

2. The computer-implemented method of claim 1, wherein receiving the at least one electronic data input includes analyzing the at least one voice input to determine at least one statement, wherein the at least one statement is analyzed to determine if a known requestor provided the at least one statement, wherein the known requestor is designated as a requestor of the task request and a profile associated with the known requestor is analyzed to determine information pertaining to the known requestor, wherein the profile is linked to at least one voice recognition data file that includes voice data associated with the known requestor.

3. The computer-implemented method of claim 1, wherein determining the at least one request attribute associated with the task request includes analyzing specific values and categorization of the at least one sensor input received by the at least one connected device and converting the at least one sensor input into the at least one request attribute, wherein a user of the at least one connected device is designated as the requestor, wherein the at least one connected device vocally confirms with the user to confirm if the user would like to make the task request.

4. The computer-implemented method of claim 1, wherein determining the at least one request attribute associated with the task request includes analyzing at least one statement and determining a content and category of the task request, wherein the at least one statement is also analyzed to determine if the requestor has requested a specific agent to execute the task request.

5. The computer-implemented method of claim 1, wherein determining the at least one request attribute associated with the task request includes analyzing at least one statement to determine if the requestor has requested at least one of: a task execution location and a task fulfillment location, wherein the task execution location is a location at which the task is executed by the agent, and the task fulfillment location is a location at which the task is fulfilled by the agent.

6. The computer-implemented method of claim 1, wherein determining the at least one request attribute associated with the task request includes determining whether at least one of: a content and category of the task request includes at least one of picking up something or picking up someone from a home of the requestor, wherein assigning the agent to execute and fulfill the task request includes assigning a specific agent who lives with the requestor and assigning at least one of: a task execution location and a task fulfillment location as the home of the requestor.

7. The computer-implemented method of claim 1, further including assigning at least one of: a task execution location and a task fulfillment location, wherein at least one of: the task execution location and the task fulfillment location are assigned based on the at least one request attribute associated with the task request.

8. The computer-implemented method of claim 1, wherein at least one speaker is electronically controlled to output vocal data that includes at least one vocal statement that is based on at least one of: the at least one voice input and the at least one sensor input, wherein the at least one vocal statement is associated with the at least one request attribute.

9. The computer-implemented method of claim 8, wherein the at least one record associated with the task that is updated upon the task database includes an active task status during the execution and fulfillment of the task by the agent, wherein the at least one record associated with the task includes a fulfilled task status upon the execution and fulfilment of the task by the agent.

10. A system for processing a task request to be executed and fulfilled, comprising: a memory storing instructions when executed by a processor cause the processor to:
electronically receive at least one electronic data input, wherein the at least one electronic data input is electronically processed based on at least one of: at least one voice input that is received as voice data that is sensed by an electronic microphone of at least one connected device and at least one sensor input that is received from at least one electronic sensor of the at least one connected device;
electronically analyze the electronic data input to electronically determine the task request based on at least one of: electronic multimodal processing of the at least one voice input to electronically determine at least one phrase that is electronically received by the connected device and is electronically parsed into at least one request attribute associated with the task request and execution of at least one of: weight logic, image logic, and LiDAR logic that is stored in an associated memory to electronically interpret a requirement to be fulfilled based on the at least one sensor input to electronically determine the at least one request attribute associated with the task request, wherein the at least one request attribute expressly includes a work to be executed and fulfilled, a classification of the task request, a specific timeframe in which to execute the task request, and a specific timeframe in which to fulfill the task request; and
electronically present a task user interface that includes the at least one request attribute associated with the task request through a computing device used by a requestor to be electronically accepted through the task user interface, wherein the at least one connected device vocally confirms with the requestor to confirm if the requestor would like to make the task request, wherein upon electronic acceptance of the task request by the requestor a computing device used by an agent is electronically controlled to present the task user interface that includes the at least one request attribute associated with the task request to the agent to be electronically accepted for the agent to execute and fulfill the task request, wherein upon electronic acceptance of the task request by the agent, a task is electronically processed and assigned to the agent to execute and fulfill the task request based on the at least one request attribute, wherein upon electronic acceptance of the task request by the agent at least one record of a task database is updated with electronic data pertaining to the accepted task, wherein the task is electronically communicated to the agent to execute and fulfill the task request through the computing device used by the agent to electronically present the task to the agent through the task user interface.

11. The system of claim 10, wherein receiving the at least one electronic data input includes analyzing the at least one voice input to determine at least one statement, wherein the at least one statement is analyzed to determine if a known requestor provided the at least one statement, wherein the known requestor is designated as a requestor of the task request and a profile associated with the known requestor is analyzed to determine information pertaining to the known requestor, wherein the profile is linked to at least one voice recognition data file that includes voice data associated with the known requestor.

12. The system of claim 10, wherein determining the at least one request attribute associated with the task request includes analyzing specific values and categorization of the at least one sensor input received by the at least one connected device and converting the at least one sensor input into the at least one request attribute, wherein a user of the at least one connected device is designated as the requestor.

13. The system of claim 10, wherein determining the at least one request attribute associated with the task request includes analyzing at least one statement and determining a content and category of the task request, wherein the at least one statement is also analyzed to determine if the requestor has requested a specific agent to execute the task request.

14. The system of claim 10, wherein determining the at least one request attribute associated with the task request includes analyzing at least one statement to determine if the requestor has requested at least one of: a task execution location and a task fulfillment location, wherein the task execution location is a location at which the task is executed by the agent, and the task fulfillment location is a location at which the task is fulfilled by the agent.

15. The system of claim 10, wherein determining the at least one request attribute associated with the task request includes determining whether at least one of: a content and category of the task request includes at least one of picking up something or picking up someone from a home of the requestor, wherein assigning the agent to execute and fulfill the task request includes assigning a specific agent who lives with the requestor and assigning at least one of: a task execution location and a task fulfillment location as the home of the requestor.

16. The system of claim 10, further including assigning at least one of: a task execution location and a task fulfillment location, wherein at least one of: the task execution location and the task fulfillment location are assigned based on the at least one request attribute associated with the task request.

17. The system of claim 10, wherein at least one speaker is electronically controlled to output vocal data that includes at least one vocal statement that is based on at least one of: the at least one voice input and the at least one sensor input, wherein the at least one vocal statement is associated with the at least one request attribute.

18. The system of claim 17, wherein the associated with the task that is updated upon the task database includes an active task status during the execution and fulfillment of the task by the agent, wherein the at least one record associated with the task includes a fulfilled task status upon the execution and fulfilment of the task by the agent.

19. A non-transitory computer readable storage medium storing instructions that when executed by a computer, which includes a processor perform a method, the method comprising:

electronically receiving at least one electronic data input, wherein the at least one electronic data input is electronically processed based on at least one of: at least one voice input that is received as voice data that is sensed by an electronic microphone of at least one connected device and at least one sensor input that is received from at least one electronic sensor of the at least one connected device;

electronically analyzing the electronic data input to electronically determine the task request based on at least one of: electronic multimodal processing of the at least one voice input to electronically determine at least one phrase that is electronically received by the connected device and is electronically parsed into at least one request attribute associated with the task request and execution of at least one of: weight logic, image logic, and LiDAR logic that is stored in an associated memory to electronically interpret a requirement to be fulfilled based on the at least one sensor input to electronically determine the at least one request attribute associated with the task request, wherein the at least one request attribute expressly includes a work to be executed and fulfilled, a classification of the task request, a specific timeframe in which to execute the task request, and a specific timeframe in which to fulfill the task request; and electronically presenting a task user interface that includes the at least one request attribute associated with the task request through a computing device used by a requestor to be electronically accepted through the task user interface, wherein the at least one connected device vocally confirms with the requestor to confirm if the requestor would like to make the task request, wherein upon electronic acceptance of the task request by the requestor a computing device used by an agent is electronically controlled to present the task user interface that includes the at least one request attribute associated with the task request to the agent to be electronically accepted for the agent to execute and fulfill the task request, wherein upon electronic acceptance of the task request by the agent, a task is electronically processed and assigned to the agent to execute and fulfill the task request based on the at least one request attribute, wherein upon electronic acceptance of the task request by the agent at least one record of a task database is updated with electronic data pertaining to the accepted task, wherein the task is electronically communicated to the agent to execute and fulfill the task request through the computing device used by the agent to electronically present the task to the agent through the task user interface.

20. The non-transitory computer readable storage medium of claim 19, wherein the at least one record associated with the task that is updated upon the task database includes an active task status during the execution and fulfillment of the task by the agent, wherein the at least one record associated with the task includes a fulfilled task status upon the execution and fulfilment of the task by the agent.

* * * * *